United States Patent
Takagi et al.

(10) Patent No.: US 10,931,363 B2
(45) Date of Patent: Feb. 23, 2021

(54) RELAY DEVICE AND NON-TRANSITORY COMPUTER READABLE MEDIUM

(71) Applicant: FUJI XEROX CO., LTD., Tokyo (JP)

(72) Inventors: Kodai Takagi, Kanagawa (JP); Kazuhiro Kaneko, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/533,802

(22) Filed: Aug. 7, 2019

(65) Prior Publication Data
US 2020/0266878 A1 Aug. 20, 2020

(30) Foreign Application Priority Data
Feb. 20, 2019 (JP) .............................. JP2019-028601

(51) Int. Cl.
H04B 7/155 (2006.01)
H04W 8/00 (2009.01)
H04W 76/14 (2018.01)
H04W 36/30 (2009.01)

(52) U.S. Cl.
CPC ..... *H04B 7/15528* (2013.01); *H04B 7/15507* (2013.01); *H04W 8/005* (2013.01); *H04W 36/305* (2018.08); *H04W 76/14* (2018.02)

(58) Field of Classification Search
CPC ........... H04B 7/15528; H04B 7/15507; H04W 76/14; H04W 36/305; H04W 8/005
See application file for complete search history.

(56) References Cited

U.S. PATENT DOCUMENTS

| | | | |
|---|---|---|---|
| 2007/0010971 A1 | 1/2007 | Nikolova et al. | |
| 2013/0029589 A1* | 1/2013 | Bontu | H04W 48/20 455/7 |
| 2014/0237036 A1* | 8/2014 | Tanimoto | H04L 67/42 709/203 |
| 2018/0110001 A1* | 4/2018 | Yasukawa | H04W 52/0216 |
| 2018/0184436 A1* | 6/2018 | Ohtsuji | H04B 7/2606 |

FOREIGN PATENT DOCUMENTS

| | | |
|---|---|---|
| JP | 2007-019809 | 1/2007 |
| JP | 2007-515909 | 6/2007 |
| JP | 2008-027127 | 2/2008 |
| JP | 2010-041088 | 2/2010 |

* cited by examiner

*Primary Examiner* — Duc C Ho
(74) *Attorney, Agent, or Firm* — JCIPRNET

(57) ABSTRACT

A relay device is provided with a detection unit, a reply unit, and a transmission unit. The detection unit detects an inability to connect to a wide-area information communication network in a case in which the relay device is multiplexed with another relay device. In a case in which the detection unit detects the inability to connect to the wide-area information communication network, when a request searching for a replacement partner is received from another relay device, the reply unit replies to the other relay device with information indicating that the relay device itself is a replacement candidate. The transmission unit transmits information set in the relay device itself to the other relay device.

4 Claims, 18 Drawing Sheets

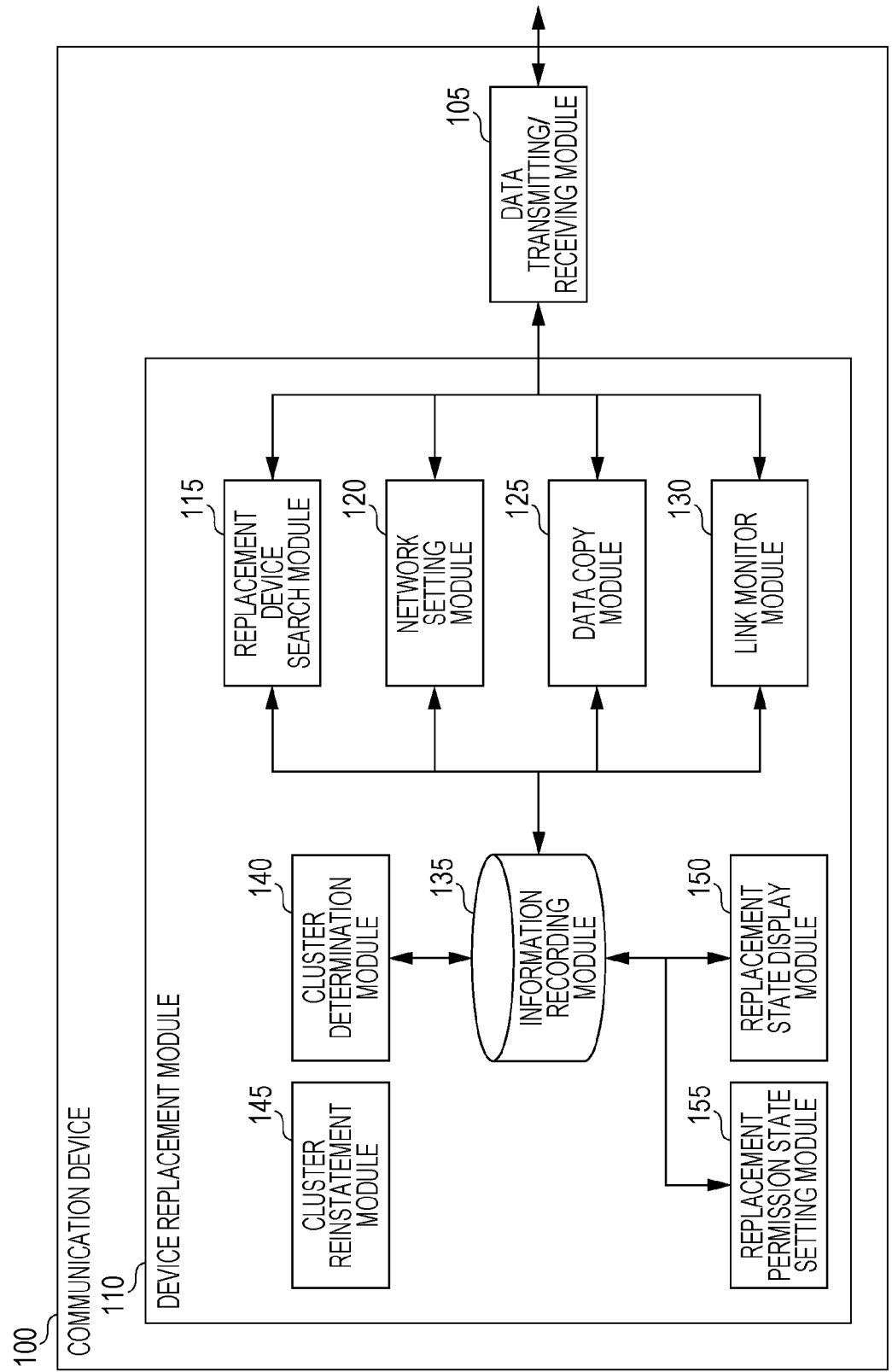

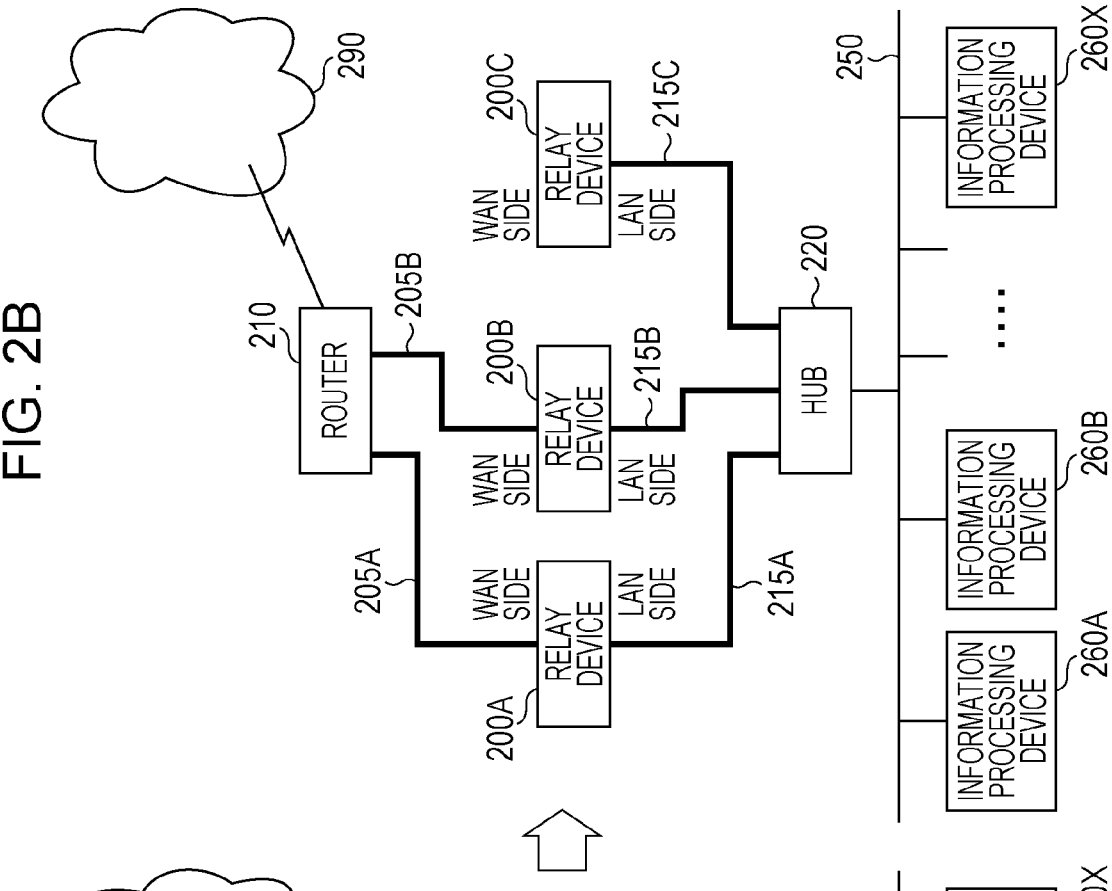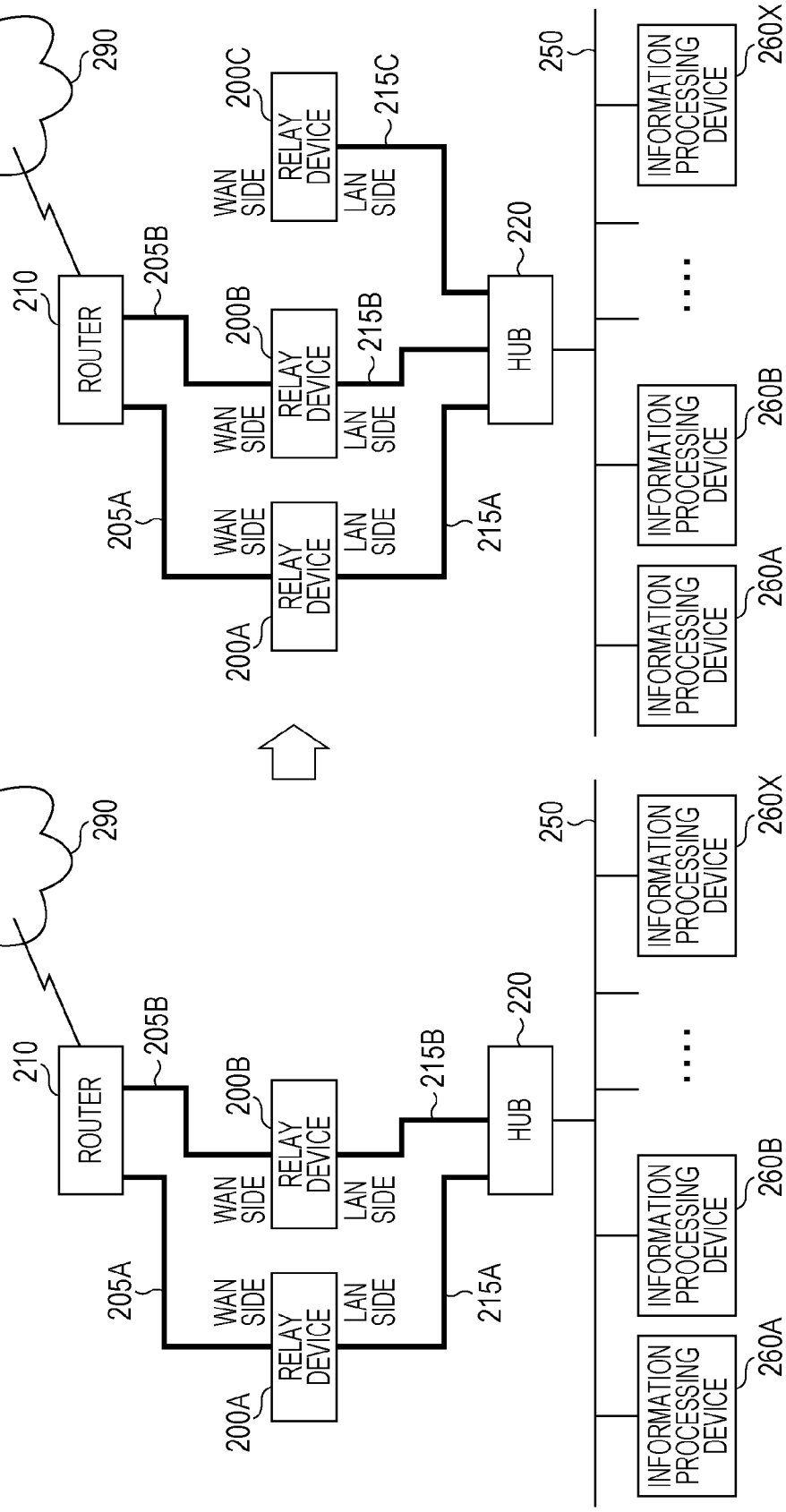

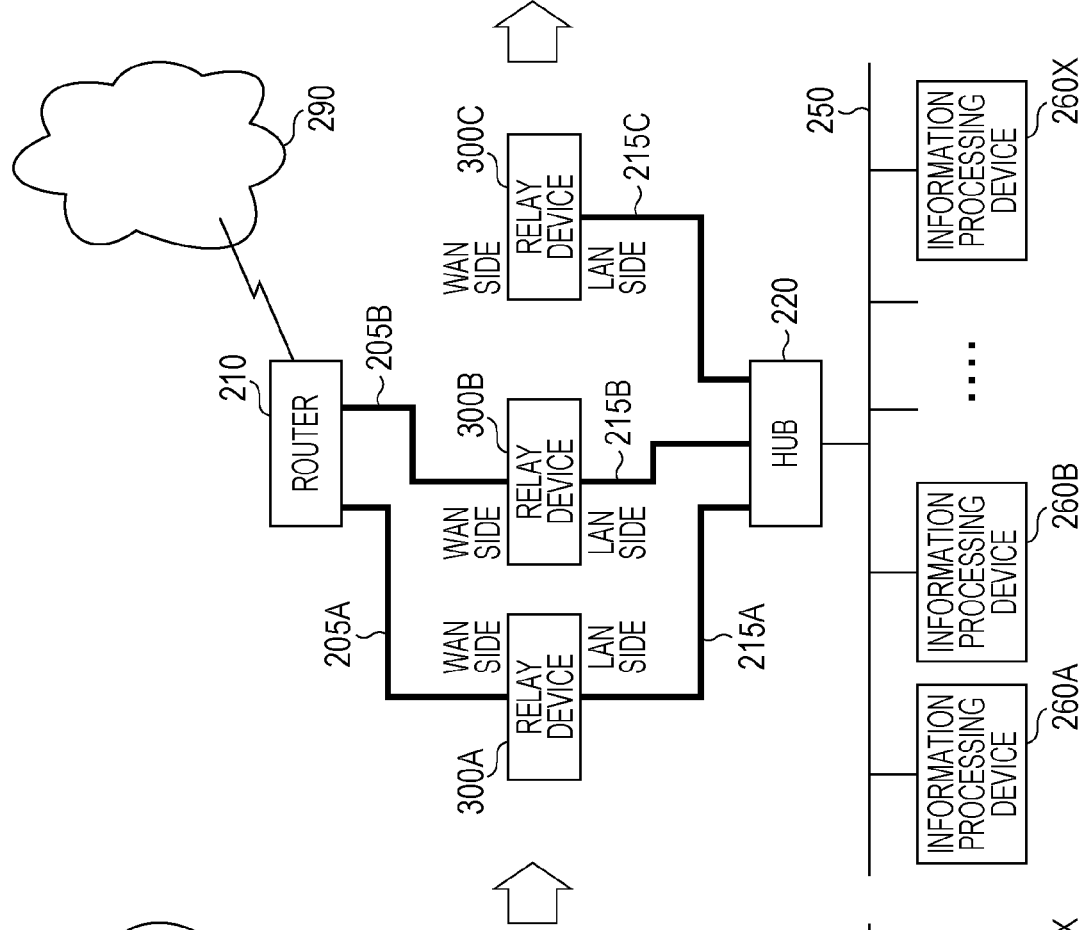
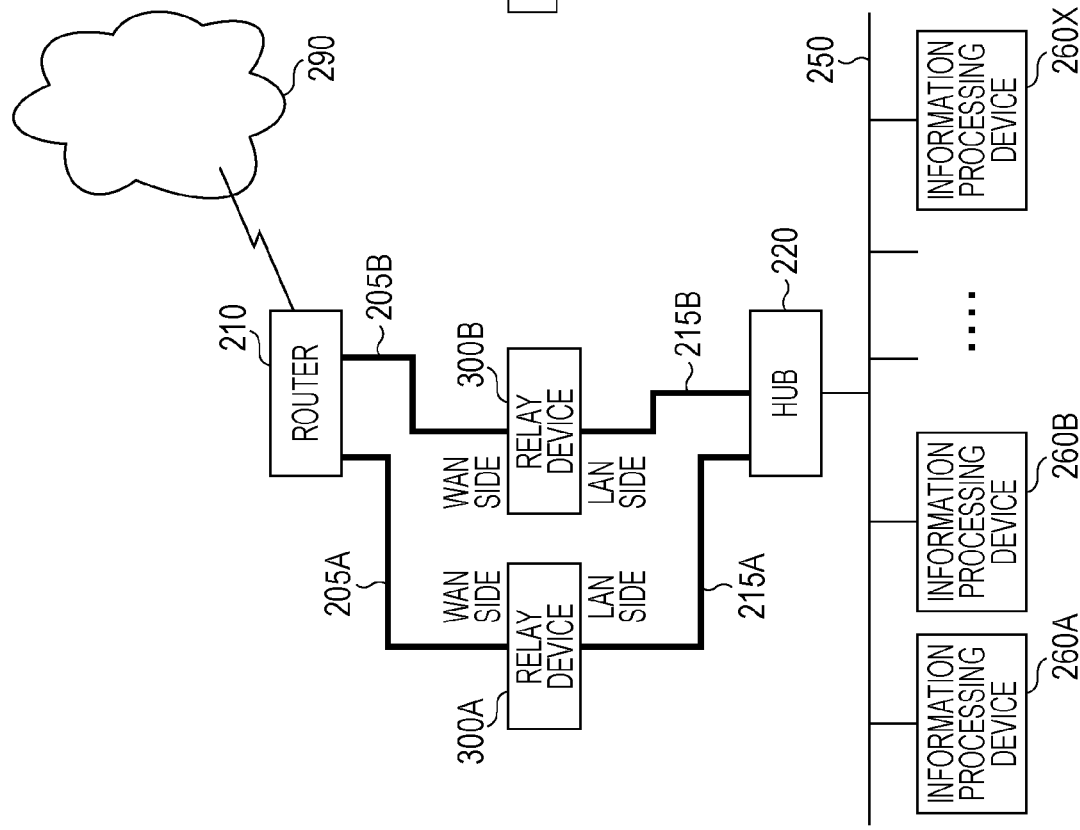

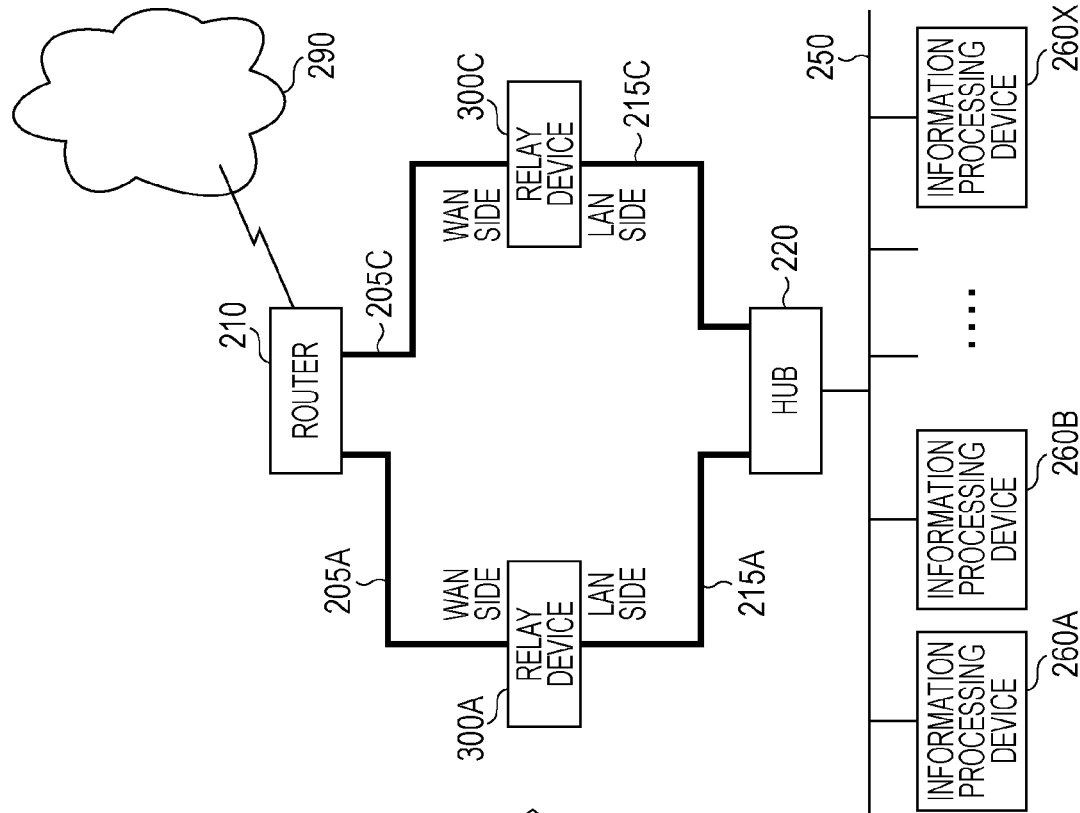
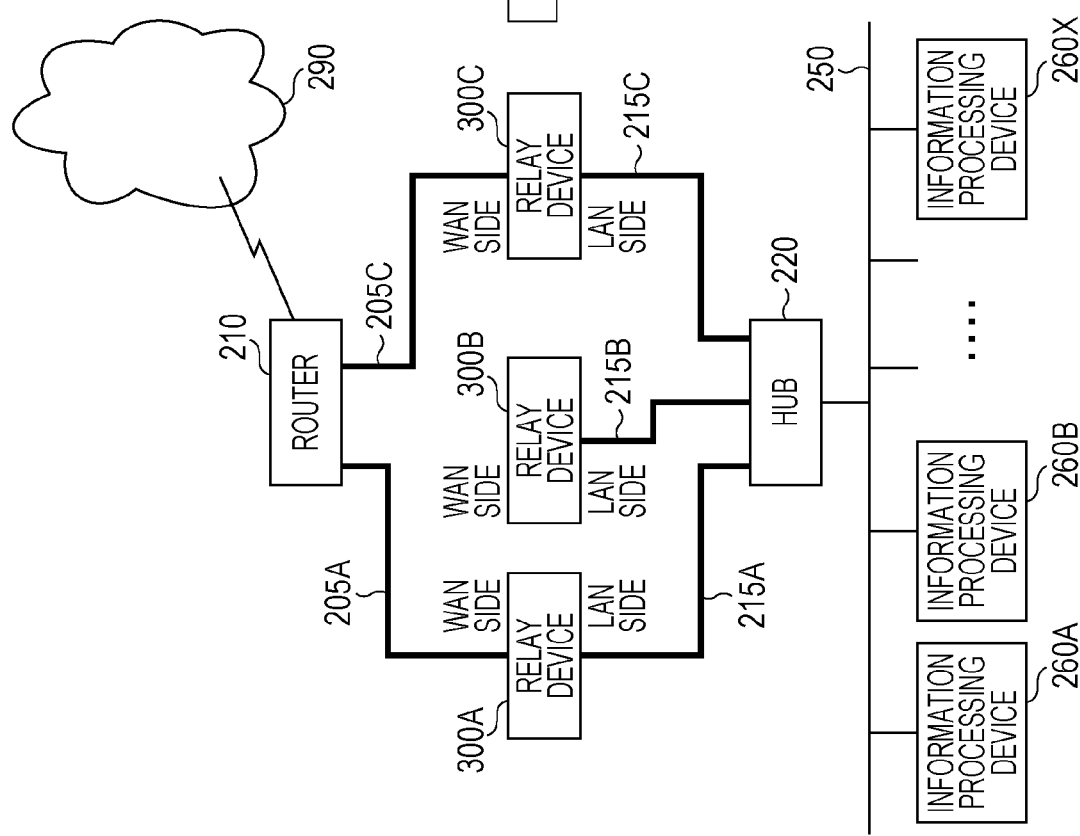

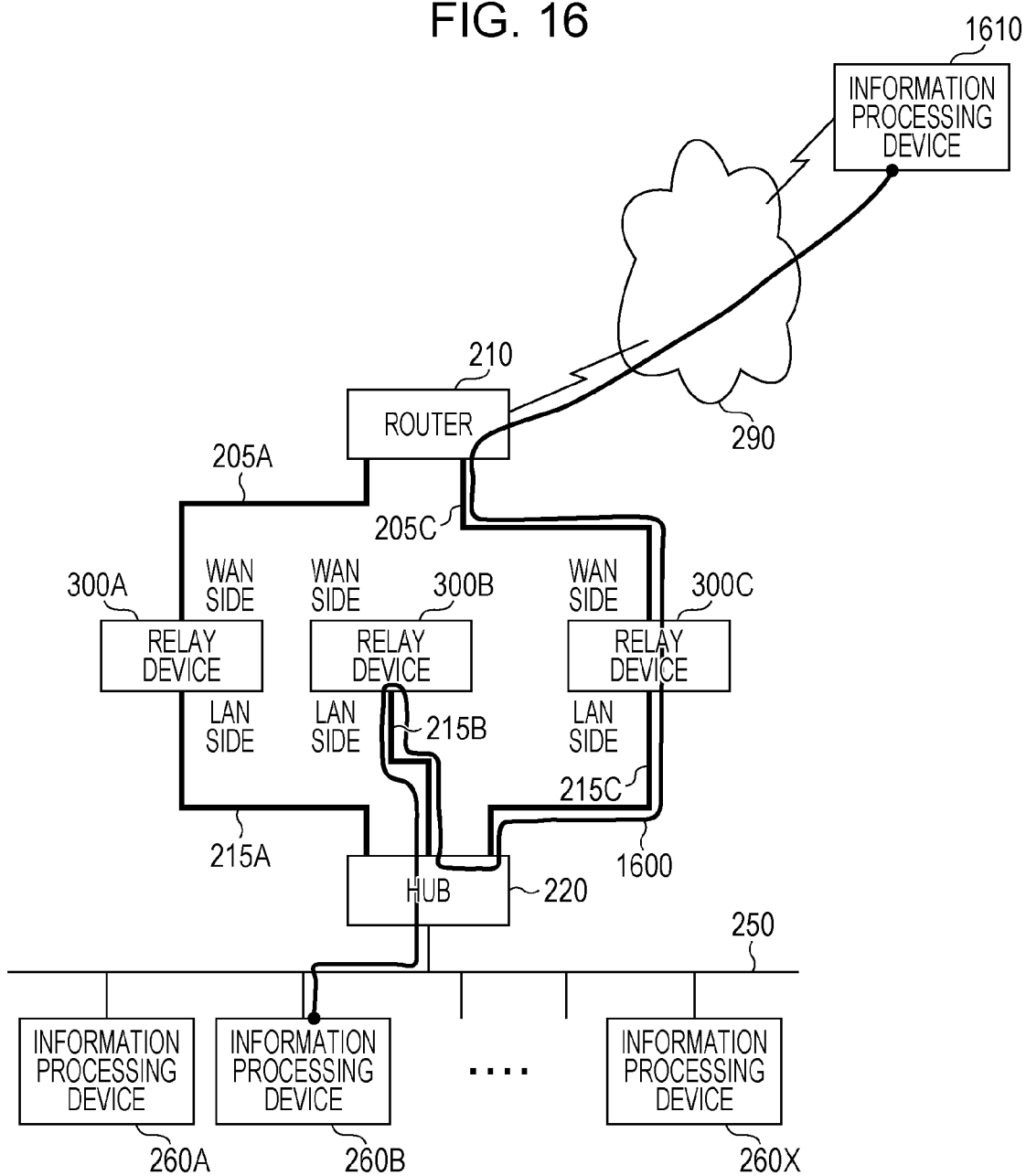

RELAY DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-028601 filed Feb. 20, 2019.

BACKGROUND

(i) Technical Field

The present disclosure relates to a relay device and a non-transitory computer readable medium.

(ii) Related Art

Japanese Unexamined Patent Application Publication No. 2010-041088 addresses the issue of providing a terminal accommodation switching system and method that correctly relocate a terminal accommodated by a call agent to a different call agent, and discloses a terminal accommodation switching system provided with one or multiple first call control mediating devices that accommodate multiple terminals that communicate by performing call control with an opposing terminal, and a variable address setting means that assigns a variable address of a call control mediating device to a terminal. Each first call control mediating device relocates by assigning stored subscriber information of each accommodated terminal to a second call control mediating device to switch to. After the relocation of the subscriber information, a message forwarding means converts and forwards a call control message addressed to each first call control mediating device or each second call control mediating device to each second call control mediating device or to each first call control mediating device. The variable address setting means changes the variable address of the call control mediating device assigned to each accommodated terminal from the first call control mediating device to the second call control mediating device.

Japanese Unexamined Patent Application Publication No. 2007-019809 addresses the issue of causing a post-replacement multi-function device to inherit information set in a pre-replacement multi-function device, without installing a dedicated interface or a dedicated server, and discloses an image forming device including a generating means that generates information about the image forming device in a transmittable format, a transmitting means that transmits the generated information to an external device, a receiving means that receives information from the external device, a distinguishing means that distinguishes information about the image forming device from among the received information, and a setting means that sets the distinguished information in the image forming device.

Japanese Unexamined Patent Application Publication No. 2007-515909 (Translation of PCT International Application Publication) provides a method of dynamically organizing router operations, in which preferably a heterogeneous communication network conforming to current IPv4-IPv6 standards is provided, and the network includes several interconnected nodes including one or multiple candidate devices. Furthermore, several of the nodes are capable of operating as a data router. In the case in which an existing routing node becomes inoperative, the method includes using a candidate device to take over the routing function. Furthermore, to announce the presence of the node on the network, a link-local router advertisement for the node is used. Furthermore, the network uses a monitor to act as an arbiter deciding which of the nodes is allowed to operate as a router, and in the case in which a mismatch and/or a collision in the router assignment occurs during operation, the node is configured to communicate with the monitor. Through the use of the monitor, the network becomes capable of reconfiguring routers dynamically, and thereby becomes more robust.

Japanese Unexamined Patent Application Publication No. 2008-027127 addresses the issue of providing an information processing device, a device setting system, and a program capable of setting the same settings as a setting source device in a setting target device, even if the format of the setting information is different between the setting source and the setting target. A management PC compares a specification A of the setting information of the setting source to a specification B of the setting information of the setting target, and if the result of the comparison is that either of the specification information A and B is "*", the result means "a setting item that should be set to a different setting value for each individual device". Also, if the specification information A and B is such that A≠B, the versions are different. Consequently, in these cases, if there is a corresponding conversion process, the setting content of the setting source is converted into setting content adapted to the setting target in accordance with the conversion process. On the other hand, in the case in which the specification information A and B is such that A=B, the version is the same, and therefore the setting content of the setting source is copied directly to the setting target.

There exist relay devices that act as a relay between wide-area information communication networks and local information communication networks. Additionally, multiple relay devices are being used in a multiplexed manner.

SUMMARY

In the case of replacing a relay device A in use with another relay device B, to copy information inside the relay device A to the relay device B, a user may have to set up the relay device A and the relay device B to pair with each other. In particular, in the case in which multiplexing is being performed with multiple relay devices, since there are multiple relay devices in use, the relay device to treat as the target of replacement may be set incorrectly in some cases.

Aspects of non-limiting embodiments of the present disclosure relate to suppressing the incorrect setting of relay devices to pair with each other in the case of replacing a first relay device in use, which is multiplexed with another relay device, with a second relay device.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a relay device provided with a detection unit, a reply unit, and a transmission unit. The detection unit detects an inability to connect to a wide-area information communication network in a case in which the relay device is multiplexed with another relay device. In a case in which the detection unit detects the inability to connect to the wide-area information communication network, when a request searching for a replacement partner is received from another relay device, the reply unit replies to the other relay device with information indicating that the relay device itself is a replacement candidate. The transmission unit transmits information set in the relay device itself to the other relay device.

BRIEF DESCRIPTION OF THE DRAWINGS

An exemplary embodiment of the present disclosure will be described in detail based on the following figures, wherein:

FIG. 1 is a schematic module configuration diagram of an exemplary configuration according to the exemplary embodiment;

FIGS. 2A and 2B are explanatory diagrams illustrating an exemplary process of replacing a relay device B with a relay device according to technology of the related art;

FIGS. 3A and 3B are explanatory diagrams illustrating an exemplary process of replacing a relay device B with a relay device according to the exemplary embodiment;

FIGS. 3C and 3D are explanatory diagrams illustrating an exemplary process of replacing a relay device B with a relay device according to the exemplary embodiment;

FIG. 16 is an explanatory diagram illustrating an exemplary process according to the exemplary embodiment.

DETAILED DESCRIPTION

Figure 4:
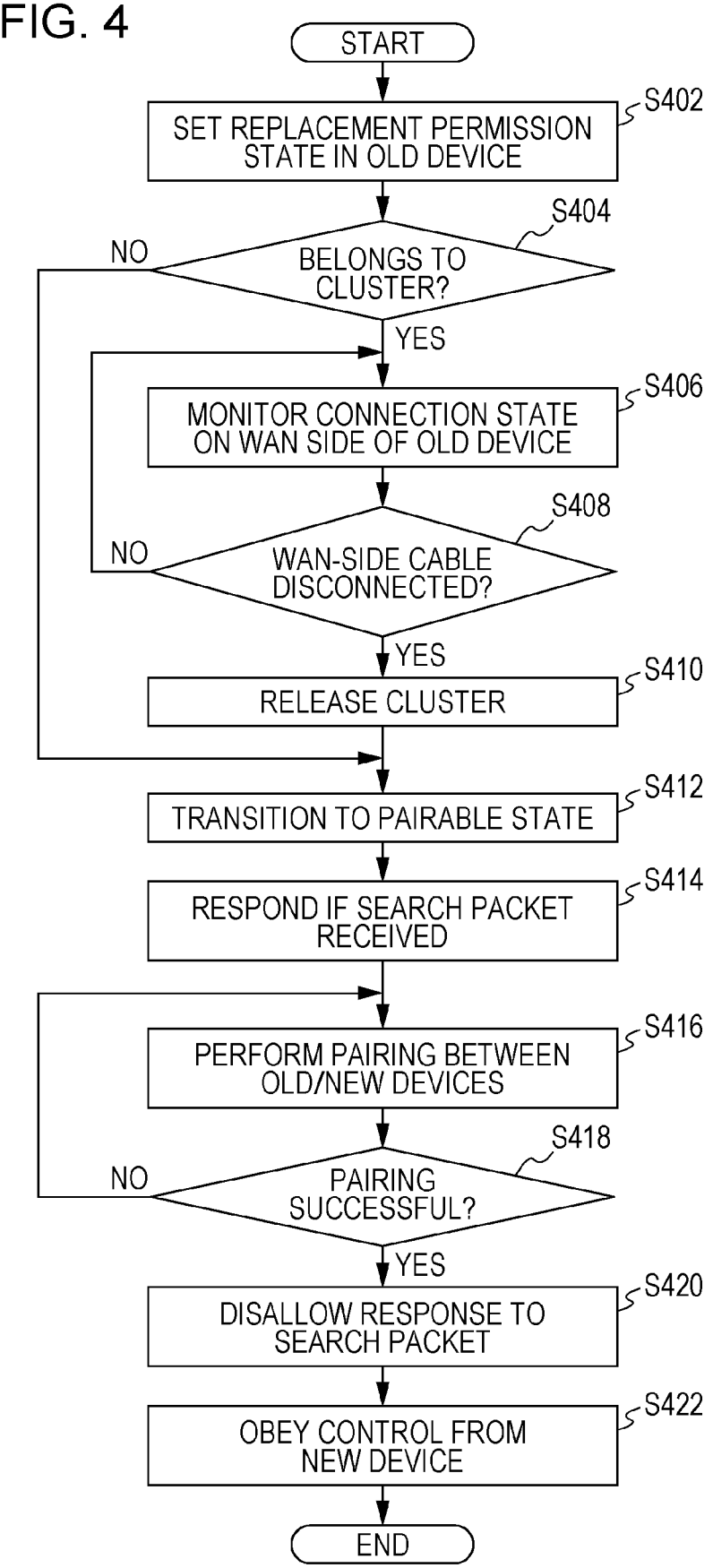
FIG. 4 is a flowchart illustrating an exemplary process according to the exemplary embodiment.

Hereinafter, an exemplary embodiment related to realizing the present disclosure will be described by way of example on the basis of the drawings.

FIG. 1 illustrates a schematic module configuration for an exemplary configuration according to the exemplary embodiment.

Note that the term module refers to components such as software (computer programs are included as an interpretation of "software") and hardware which are typically capable of being logically separated. Consequently, the term module in the exemplary embodiment not only refers to modules in a computer program, but also to modules in a hardware configuration. Thus, the exemplary embodiment also serves as a description of a computer program (for example, a program that causes a computer to execute respective operations, a program that causes a computer to function as respective units, or a program that causes a computer to realize respective functions), a system, and a method for inducing functionality as such modules. Note that although terms like "store" and "record" and their equivalents may be used in the description for the sake of convenience, these terms mean that a storage device is made to store information or that control is applied to cause a storage device to store information in the case where the exemplary embodiment is a computer program. Also, while modules may be made to correspond with function on a one-to-one basis, some implementations may be configured such that one program constitutes one module, such that one program constitutes multiple modules, or conversely, such that multiple programs constitute one module. Moreover, multiple modules may be executed by one computer, but one module may also be executed by multiple computers in a distributed or parallel computing environment. Note that a single module may also contain other modules. Also, the term "connection" may be used hereinafter to denote logical connections (such as the transfer of data, instructions, referential relationships between data, and logins, for example) in addition to physical connections. The term "predetermined" refers to something being determined prior to the processing in question, and obviously denotes something that is determined before a process according to the exemplary embodiment starts, but may also denote something that is determined after a process according to the exemplary embodiment has started but before the processing in question, in accordance with conditions or states at that time, or in accordance with conditions or states up to that time. In the case of multiple "predetermined values", the predetermined values may be respectively different values, or two or more values ("two or more values" obviously also includes the case of all values) which are the same. Additionally, statements like "B is performed in the case of A" are used to denote that a determination is made regarding whether or not A holds true, and B is performed in the case where it is determined that A holds true. However, this excludes cases where the determination of whether or not A holds true may be omitted. Also, in the case of listing things, like "A, B, C" and so on, the listing is an illustrative example unless specifically noted otherwise, and includes the case of choosing only one among the listing (for example, A only).

Also, the terms "system" and "device" not only encompass configurations in which multiple computers, hardware, or devices are connected by a communication medium such as a network (where "network" includes connections that support 1-to-1 communication), but also encompass configurations realized by a single computer, hardware, or device. The terms "device" and "system" are used interchangeably. Obviously, the term "system" does not include merely artificially arranged social constructs (in other words, social systems).

Also, every time a process is performed by each module or every time multiple processes are performed within a module, information to be processed is retrieved from a storage device, and the processing results are written back to the storage device after the processing. Consequently, description of the retrieval from a storage device before processing and the writing back to a storage device after processing may be reduced or omitted in some cases. Note that the storage device herein may include a hard disk drive, random access memory (RAM), an auxiliary or external storage medium, a storage device accessed via a communication link, and a register or the like inside a central processing unit (CPU).

A communication device 100 according to the exemplary embodiment includes a relay function for communication, and as illustrated by the example in FIG. 1, includes a data transmitting/receiving module 105 and a device replacement module 110. The communication device 100 is also referred as a relay device, a network device, or the like.

The communication device 100 connects a wide-area information communication network with a local information communication network. Note that the wide-area information communication network is typically referred to as a wide-area network (WAN), and the local information communication network is typically referred to as a local area network (LAN). Also, devices typically referred to as gateway devices are also included as the communication device 100. For example, a relay device between a router and a hub (also referred to as a switching hub) is applicable. Note that the communication device 100 may also have a Web filtering function, an antivirus function, and the like, and may have administrator information registered.

In some cases, a situation of replacing the communication device 100 occurs. For example, the communication device 100 that had been used so far may be replaced with a new communication device 100 in some cases. Particularly, in the case in which multiple communication devices 100 are used in a multiplexed manner, when replacing one of the communication devices 100, it is necessary to designate the communication device 100 to be replaced (the communication device 100 that acts as the old device) in the technology of the related art. For this reason, an incorrect communication device 100 may be targeted for replacement in some cases. Details about replacement in the technology of the related art will be described later using FIGS. 2A and 2B. In the communication device 100 according to the exemplary embodiment, the incorrect setting of relay devices to pair with each other is suppressed. Note that multiplexing is typically also referred to as clustering. Also, replacement refers to substituting the communication device 100 that had been used so far with a new communication device 100.

From a state in which a wide-area information communication network cable and a local information communication network cable are connected to a first communication device 100, the wide-area information communication network cable is removed by a user. Disconnecting the wide-area information communication network from the communication device 100 means that the communication device 100 is designated as the communication device 100 to be replaced. Also, a second communication device 100 is in a state in which the wide-area information communication network cable and the local information communication network cable are connected. However, in the state immediately after this connection (in other words, the state before copying the information inside the first communication device 100), the second communication device 100 does not function as a relay device by itself.

The data transmitting/receiving module 105 is connected to a replacement device search module 115, a network setting module 120, a data copy module 125, and a link monitor module 130 of the device replacement module 110. The data transmitting/receiving module 105 communicates with the communication device 100 and external devices such as a router 210 and a hub 220.

The device replacement module 110 includes both the functions of the relay device to be replaced (typically referred to as the old relay device that had been used so far, and hereinafter referred to as the first communication device 100), and the functions of the replacing relay device (an example of a second relay device and the relay device to be used after replacement, typically referred to as the new relay device, and hereinafter referred to as the second communication device 100). This is because by being used, the replacing relay device may become a relay device to be replaced at a later time. Obviously, a configuration of the communication device 100 having only the functions of the relay device to be replaced or a configuration of the communication device 100 having only the functions of the replacing relay device is also acceptable.

The device replacement module 110 includes the replacement device search module 115, the network setting module 120, the data copy module 125, the link monitor module 130, an information recording module 135, a cluster determination module 140, a cluster reinstatement module 145, a replacement state display module 150, and a replacement permission state setting module 155.

The replacement device search module 115 is connected to the data transmitting/receiving module 105 and the information recording module 135.

The replacement device search module 115 searches for a communication device 100 satisfying a replaceable condition, and establishes a pairing. Pairing refers to specifying a communication device 100 to replace and establishing a connection with the communication device 100 that enables communication.

The link monitor module 130 is connected to the data transmitting/receiving module 105 and the information recording module 135.

The link monitor module 130 monitors whether or not a connection with the wide-area information communication network is available through the first communication device 100, and if a connection with the wide-area information communication network is unavailable, transitions to a pairable state. Note that, as described later using the example in FIGS. 3A to 3D, removing the wide-area information communication network cable corresponds to declaring that the corresponding communication device 100 is the first communication device 100.

The network setting module 120 is connected to the data transmitting/receiving module 105 and the information recording module 135.

The network setting module 120 sets up a network enabling the first communication device 100 to connect to the wide-area information communication network through the second communication device 100.

The cluster determination module 140 is connected to the information recording module 135.

The cluster determination module 140 determines whether or not its own communication device 100 is in a cluster configuration. Typically, it is sufficient to determine whether or not the first communication device 100 is in a cluster configuration. For example, because information indicating a cluster configuration or not (typically, information referred to as a flag) is stored in the information recording module 135, it is sufficient to make a determination using this information.

The cluster reinstatement module 145 sets a setting to reinstate the first communication device 100 into a cluster configuration.

The data copy module 125 is connected to the data transmitting/receiving module 105 and the information recording module 135.

The data copy module 125 copies data in the first communication device 100 to a paired device. The data is, for example, settings and logs of the first communication device 100. Also, in the case of the second communication device 100, the data copy module 125 receives data from the first communication device 100, stores the data in the information recording module 135 of the second communication device 100, and sets settings and the like for functioning as the first communication device 100.

The replacement permission state setting module 155 is connected to the information recording module 135.

The replacement permission state setting module 155 deters unintentional replacement by setting information indicating a state that permits replacement of the first communication device 100.

The replacement state display module 150 is connected to the information recording module 135.

The replacement state display module 150 presents a display enabling a user to check the progress and result of data migration.

Additionally, the replacement state display module 150 may display the status of processing by the first communication device 100 or the status of processing by the second communication device 100 acting as a pair with the first communication device 100.

Note that the replacement state display module 150 may be included in the first communication device 100 and may also be included in the second communication device 100. Also, the display process by the replacement state display module 150 may be performed by the first communication device 100 and may also be performed by the second communication device 100.

The information recording module 135 is connected to the replacement device search module 115, the network setting module 120, the data copy module 125, the link monitor module 130, the cluster determination module 140, the replacement state display module 150, and the replacement permission state setting module 155.

The information recording module 135 stores information indicating the cluster state, initialized information, pairing information, information indicating the replacement permission state, and information indicating the replacement progress.

The "cluster state" refers to information indicating whether or not the communication device 100 is in a cluster. The information indicating the cluster state is assumed to be pre-stored in the information recording module 135.

The "initialized information" refers to information indicating whether or not the communication device 100 has been initialized. In the stage before replacement, the old communication device 100 to be replaced is running in a state with settings already set (initialized), while the new communication device 100 is still in a state in which no settings have been set (uninitialized). The information recording module 135 stores information indicating whether the communication device 100 is initialized or uninitialized. The copying of data is desirably executed in the direction from the "initialized" communication device 100 to the "uninitialized" communication device 100. With this arrangement, the copying of data in the wrong direction may be avoided. The "uninitialized" communication device 100 searches for the communication device 100 to be replaced.

The "initialized" communication device 100 responds to the search. The above causes the pairing state described next to occur.

The "pairing information" refers to information indicating the device to pair with. When pairing is performed initially, information indicating the communication device 100 to pair with is stored in the information recording module 135. After that, the communication device 100 only connects to the paired communication device 100, even if a different communication device 100 is joined. With this arrangement, the recopying of data to another communication device 100 may be avoided.

The "information indicating the replacement permission state" refers to information indicating whether or not the communication device 100 is replaceable. The information indicating the replacement permission state is stored in the information recording module 135. With this arrangement, the unintentional replacement of an old communication device 100 whose replacement is prohibited may be avoided.

The "information indicating the replacement progress" refers to information to display on a screen used to inform the user of the progress of replacement. The information indicating the replacement progress is stored in the information recording module 135. Details about the information indicating the replacement progress will be described later using the examples in FIGS. 12, 13, and 14.

First, the process by the first device replacement module 110 will be described.

The link monitor module 130 detects the unavailability of a connection with the wide-area information communication network in a case in which the first communication device 100 is multiplexed with another communication device 100. Specifically, it is sufficient to detect that the WAN-side cable has been disconnected. The detection method may be, for example, detecting that communication with the WAN side is unavailable, providing a switch in the cable socket and detecting the physical insertion or removal of the cable, or detecting that the cable has been disconnected with a sensor or the like.

In the case in which the link monitor module 130 detects that the connection with the wide-area information communication network is unavailable, when a request searching for a replacement partner is received from the second communication device 100, the replacement permission state setting module 155 transmits information indicating that its own first communication device 100 is a replacement partner to the second communication device 100.

Also, after having replied to the second communication device 100 with information already, the replacement permission state setting module 155 may be configured not to reply in the case of additionally receiving a request searching for a replacement partner from another communication device 100.

The data copy module 125 transmits information set in its own first communication device 100 to the second communication device 100.

Next, the process by the second device replacement module 110 will be described.

The replacement device search module 115 transmits a request searching for a replacement partner to other communication devices 100 connected to the local information communication network side. Herein, the "other communication devices 100" include the first communication device 100. For example, in the case of transmitting the request searching for a replacement partner by broadcasting, all communication devices 100 connected to the local information communication network side become transmission destinations.

In the case in which a reply to the request transmitted by the replacement device search module 115 is received, the data copy module 125 receives information from the first communication device 100 that replied.

Additionally, the network setting module 120 sets the information received by the data copy module 125 in its own second communication device 100.

Additionally, the network setting module 120 may also be configured to set up a setting enabling the first communication device 100 that replied to connect with the wide-area information communication network through its own second communication device 100. In the case in which the configuring of predetermined information or the like is demanded on the first communication device 100 side, the above setting includes the first communication device 100 transmitting an instruction to configure the predetermined information. Details will be described later using the example in FIG. 16.

Also, after setting up the setting, the network setting module 120 may be configured to reinstate the communication device 100 that replied into the multiplexing. Herein, the "setting" in "after setting up the setting" is the "setting enabling the first communication device 100 to connect with the wide-area information communication network through its own second communication device 100".

Also, after the setting is completed, the network setting module 120 may be configured to inherit the IP address of the first communication device 100 that replied.

Additionally, the network setting module 120 may be configured to treat the timing at which to cause its own second communication device 100 to inherit the IP address of the first communication device 100 that replied to be immediately after the setting is completed by the network setting module 120, at a time designated by the user, or at a timing when performed manually by the user.

FIGS. 2A and 2B are explanatory diagrams illustrating an exemplary process of replacing a relay device 200B with a relay device 200C according to technology of the related art.

The example in FIG. 2A illustrates a state in which a relay device 200A and the relay device 200B form a cluster and are being used. For example, the illustrated configuration typically is used in the case in which a LAN 250 is an intranet, a WAN 290 is the Internet, and information processing devices 260 in an organization such as a company are connected to an information processing device such as a server connected to the WAN 290.

The relay device 200A is connected to a router 210 via a cable 205A, and to a hub 220 via a cable 215A.

The relay device 200B is connected to the router 210 via a cable 205B, and to the hub 220 via a cable 215B.

The router 210 is connected to the WAN 290, and is also connected to the relay device 200A via the cable 205A and the relay device 200B via the cable 205B.

The hub 220 is connected to the relay device 200A via the cable 215A, to the relay device 200B via the cable 215B, and to an information processing device 260A, an information processing device 260B, and so on to an information processing device 260X via a LAN 250. The information processing devices 260 are personal computers, image processing devices, and the like.

For example, the relay device 200A and the relay device 200B are clustered. Although dependent on the cluster settings, the information processing devices 260 may be grouped, such as the information processing device 260A being connected to the WAN 290 through the relay device 200A, the information processing device 260B being connected to the WAN 290 through the relay device 200B, and so on to distribute the load among the relay devices 200, or the relay device 200B may be configured to operate as a backup for the relay device 200A.

Since the relay devices 200 are clustered, multiple relay devices 200 exist between the router 210 and the hub 220.

FIG. 2B illustrates an exemplary state of attempting to replace a relay device 200 from the state illustrated in FIG. 2A.

The relay device 200A, the relay device 200B, the cable 205B and the like are in the same state as the example illustrated in FIG. 2A, but a relay device 200C has been connected to the hub 220. Namely, the relay device 200C is connected to the hub 220 via a cable 215C.

The relay device 200B is the old relay device to be replaced. The relay device 200C is the new relay device replacing the old relay device. In other words, the relay device 200C is to be installed in place of the relay device 200B.

When replacing a relay device, there is method in which, by copying data from the old relay device 200B to the new relay device 200C, the relay device 200C inherits data such as the settings and log information that had been used in the relay device 200B.

However, in the case in which the old device to be replaced is multiplexed, it may be necessary to select which relay device 200 to replace, and there is a risk of replacing the wrong relay device 200. Specifically, since the relay devices are multiplexed and there are multiple relay devices like the relay device 200A and the relay device 200B, the relay device 200A may be treated as the replacement target due to a mistaken setting set by the user, even though the user actually wants to replace the relay device 200B. For example, in the case of setting an IP address and device identification information, it may be necessary to confirm and set the IP address and device identification information of the relay device 200B, but since such information is an alphanumeric character string, it is easy to make a mistake.

Also, with the technology described in Japanese Unexamined Patent Application Publication No. 2010-041088, for example, a device used for replacement control becomes necessary in addition to the old device and the new device, and it is necessary to preset settings for replacement in the replacement control device.

Also, because the relay device 200B to be replaced does not function as part of the cluster while copying data, availability is lowered. For example, with the technology described in Japanese Unexamined Patent Application Publication No. 2008-027127, functions are stopped until the relay device is replaced and the application of settings is completed.

FIGS. 3A to 3D are explanatory diagrams illustrating an exemplary process of replacing a relay device 300B with a relay device 300C according to the exemplary embodiment.

Each relay device 300 includes the communication device 100.

In the exemplary embodiment, the new relay device 300C searches for and automatically selects the replaceable old relay device 300B, and the relay device 300B is capable of maintaining cluster functions even while data is being copied.

(S1) The old relay device 300B to be replaced is set to a replaceable state. The description will refer to FIG. 3A.

The example illustrated in FIG. 3A is substantially the same as the example illustrated in FIG. 2A. FIG. 3A illustrates a state in which a relay device 300A and the relay device 300B form a cluster and are being used. However, relay devices 300 having the communication device 100 built in are used as the relay devices.

Note that setting the relay device 300B to a replaceable state also includes removing the relay device 300B from the cluster.

(S2) The new relay device 300C is connected to the LAN side. The description will refer to FIG. 3B.

The example illustrated in FIG. 3B illustrates a state in which the relay device 300C is connected to the hub 220 using the cable 215C. The relay device 300C is the relay device that will replace the relay device 300B.

(S3) The WAN-side cable 205B of the old relay device 300B to be replaced is disconnected, and the new relay device 300C is connected to the WAN side. The description will refer to FIG. 3C.

The example illustrated in FIG. 3C illustrates a state in which the cable 205B is disconnected from the relay device 300B, and a cable 205C is used to connect the relay device 300C to the router 210. With this arrangement, the relay device 300C becomes connected to the router 210 via the cable 205C and to the hub 220 via the cable 215C. Additionally, a connection to the WAN 290 directly from the relay device 300B is made unavailable. Note that, as described later, a connection to the WAN 290 through the relay device 300C is available.

(S4) The new relay device 300C searches for the relay device 300B to be replaced. In other words, if the replaceable relay device 300B having a disconnected WAN-side cable is found, copying between the relay device 300B and the relay device 300C is started.

(S5) The old relay device 300B is reinstated into the cluster, and accesses the WAN by going through the new relay device 300C. In other words, the information processing devices 260 and the like become capable of accessing the WAN 290 via the relay device 300B.

(S6) After the data copy is completed, the old relay device 300B shuts down. The new relay device 300C copies information including the IP address of the relay device 300B, and takes the place of the relay device 300B. Obviously, the relay device 300C continues services such as connecting the information processing devices 260B and the like to the WAN 290.

(S7) The old relay device 300B is removed. The description will refer to FIG. 3D.

The example illustrated in FIG. 3D illustrates a state in which the relay device 300B has been removed and the relay device 300C is functioning in place of the relay device 300B. Obviously, the relay device 300A and the relay device 300B are clustered.

Note that the processes in (S1), (S2), (S6), and (S7) are also performed in the technology of the related art described earlier. The processes in (S3), (S4), and (S5) are processes newly performed in the exemplary embodiment.

In the example illustrated in FIGS. 3A to 3D, a separate device other than the old relay device and the new relay device is not required. Additionally, the functions of the old relay device do not stop until the application of settings is completed. Furthermore, unintentional replacement does not occur even if the old relay device is multiplexed. Also, the old relay device may be functionally reinstated into the cluster even during the replacement process.

FIG. 4 is a flowchart illustrating an exemplary process according to the exemplary embodiment. FIG. 4 illustrates an exemplary process in the old relay device 300B to be replaced.

In step S402, the replacement permission state is set in the old device.

With this arrangement, unintentional replacement of a relay device 300 is avoided. Pairing is not performed with a relay device 300 in which the replacement permission state is not set.

There are various methods of setting the replacement permission state.

Figure 9:
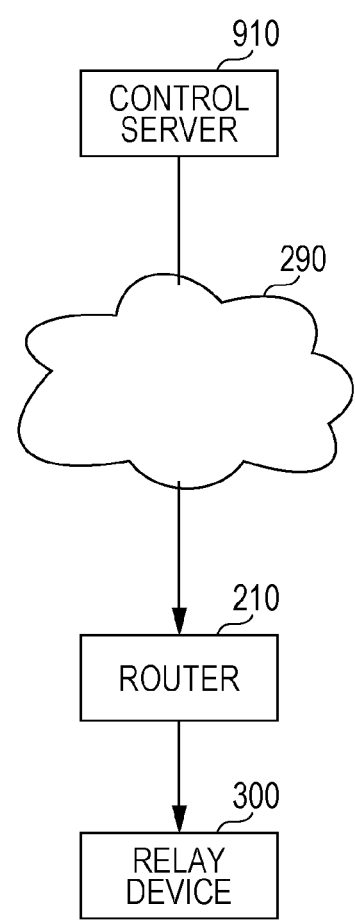
FIG. 9 is an explanatory diagram illustrating an exemplary process according to the exemplary embodiment.

For example, there is a method of remotely setting the replacement permission state in the old device from a control server 910 connected to the WAN 290. FIG. 9 is an explanatory diagram illustrating an exemplary process according to the exemplary embodiment.

The control server 910 is connected to the router 210 through the WAN 290. The router 210 is connected to the relay device 300, and is also connected to the control server 910 through the WAN 290. The relay device 300 is connected to the router 210. In other words, the control server 910 is connected to the relay device 300 through the WAN 290 and the router 210.

the control server 910 issues a replacement permit with respect to a relay device 300. For example, a screen 1000 illustrated in the example of FIG. 10 may be displayed on a display device of the control server 910, and an operation by a user may be accepted.

Subsequently, the relay device 300 receives the replacement permit issued from the control server 910, and transitions to the replacement permission state.

As another example, there is a method of setting the replacement permission state through a user interface.

Figure 10:
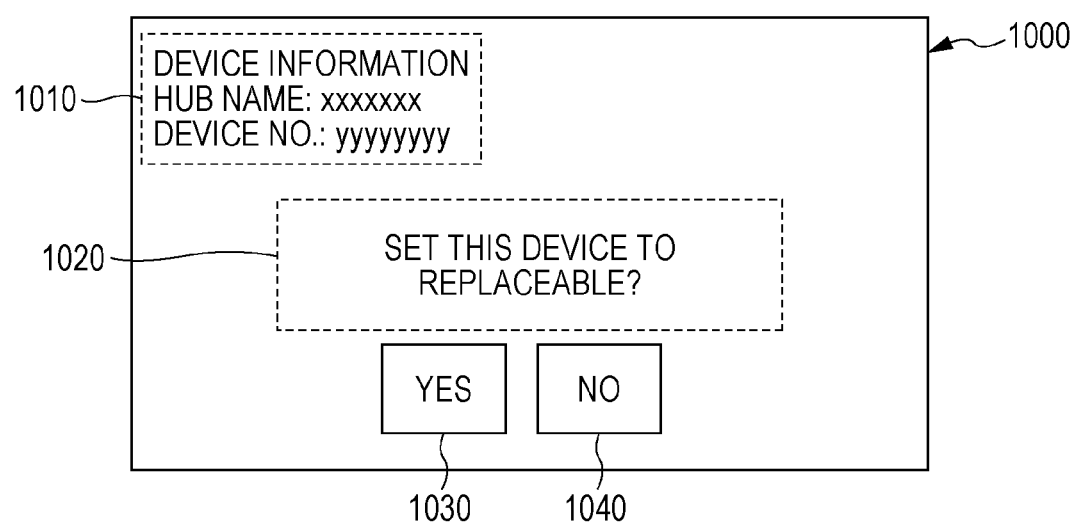
FIG. 10 is an explanatory diagram illustrating an exemplary display according to the exemplary embodiment.

The screen 1000 illustrated in the example of FIG. 10 may also be displayed on a screen of the relay device 300. FIG. 10 is an explanatory diagram illustrating an exemplary display according to the exemplary embodiment. On the screen 1000, a device information display region 1010, a message region 1020, a YES button 1030, and a NO button 1040 are displayed.

In the device information display region 1010, "Device information, Hub name: xxxxxxx, Device No.: yyyyyyyy" is displayed, for example.

In the message region 1020, "Set this device to replaceable?" is displayed, for example.

In the case in which the YES button 1030 is selected by the user, the relay device 300 is set to the replacement permission state. In the case in which the NO button 1040 is selected by the user, the relay device 300 is not set to the replacement permission state.

In step S404, it is determined whether or not the relay device 300 is part of a cluster, and if part of a cluster the flow proceeds to step S406, otherwise the flow proceeds to step S412. Note that since information regarding whether or not the relay device 300 is part of a cluster is stored in the information recording module 135 in advance, it is sufficient to reference such information to make the above determination.

In step S406, the connection state on the WAN side of the old device is monitored. In other words, the connection status of the line on the WAN side of the old relay device 300 in the replacement permission state is monitored.

In step S408, it is determined whether or not the WAN-side cable is disconnected, and if disconnected the flow proceeds to step S410, otherwise the flow returns to step S406. For example, the WAN-side cable 205B is disconnected from the relay device 300B by an operator (see FIG. 3C). Note that pairing is not performed with a relay device 300 still connected to the WAN side, even if the relay device 300 is in the replacement permission state. If the line on the WAN side is disconnected, the relay device 300 transitions to a pairable state.

In step S410, the cluster is released. In the example of FIGS. 3A to 3D, the relay device 300B is clustered with the relay device 300A, and this cluster is released. Consequently, in this state, only the relay device 300A is connected to the WAN side.

In step S412, the relay device 300 transitions to a pairable state.

In step S414, a response is transmitted if a search packet is received. In other words, if a package of a search broadcast is received while in the pairable state, the relay device 300 responds to the transmission source. In the example of FIGS. 3A to 3D, the relay device 300C broadcasts a search packet that the relay device 300B receives and responds to.

In step S416, the new and old devices are paired. In the example of FIGS. 3A to 3D, the relay device 300B is paired with the relay device 300C.

In step S418, it is determined whether or not pairing was successful, and if so, the flow proceeds to step S420, otherwise the flow returns to step S416.

In step S420, responses to search packets are disallowed. In other words, even if the relay device 300 receives a search packet from another relay device, the relay device 300 does not respond.

In step S422, the relay device 300 obeys control from the new device. In the example of FIGS. 3A to 3D, the relay device 300B obeys control from the relay device 300C.

Figure 5:
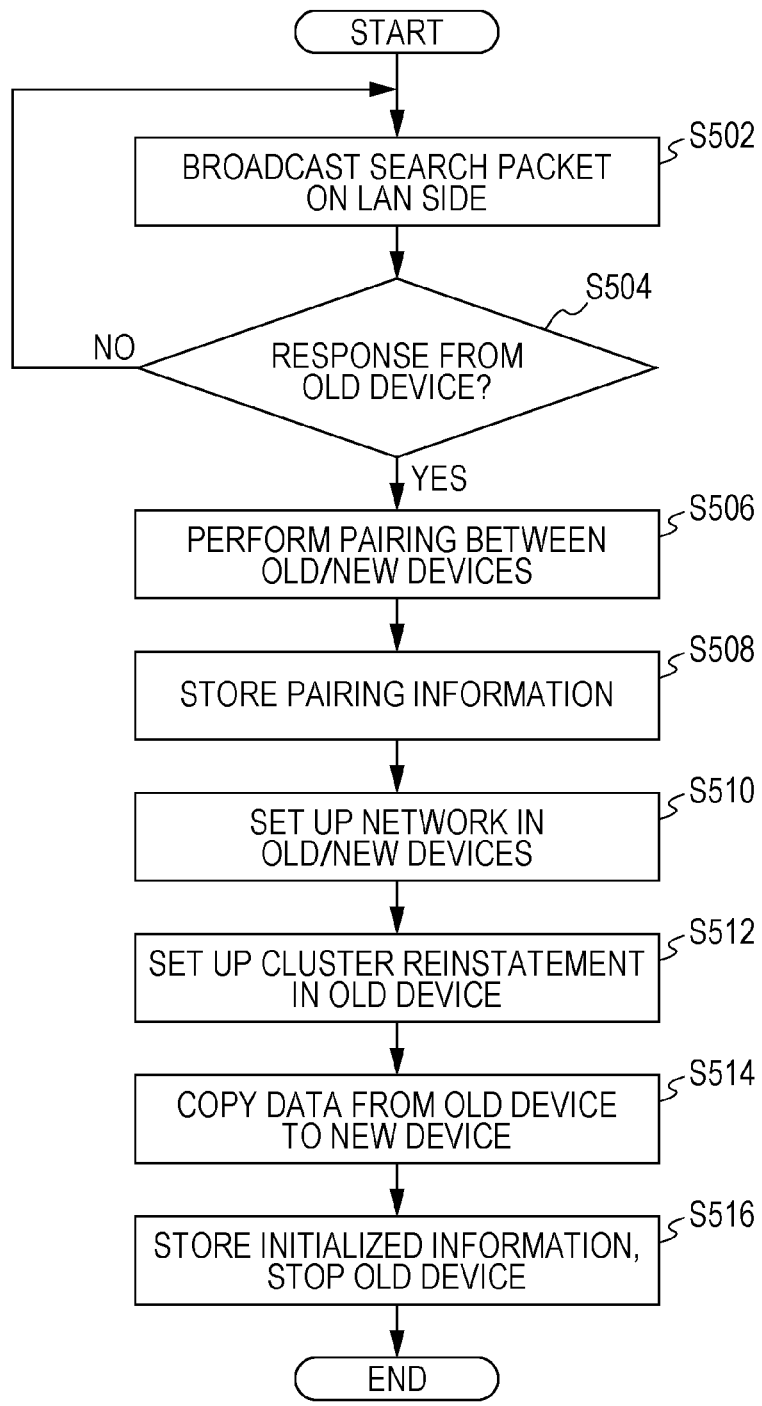
FIG. 5 is a flowchart illustrating an exemplary process according to the exemplary embodiment.

FIG. 5 is a flowchart illustrating an exemplary process according to the exemplary embodiment. FIG. 5 illustrates an exemplary process in the new relay device 300C.

In step S502, a search packet is broadcast on the LAN side. In the example of FIGS. 3A to 3D, a search packet is transmitted to the relay device 300A and the relay device 300B.

In step S504, it is determined whether or not there is a response from the old device, and if so the flow proceeds to step S506, otherwise the flow returns to step S502. In the example of FIGS. 3A to 3D, a response is obtained from the relay device 300B whose WAN-side cable is disconnected.

Through steps S502 and S504, the new relay device 300C transmits a broadcast packet on the LAN side and thereby searches for a pairable relay device 300. If there is a response to the search packet, it is determined that a pairable relay device 300 exists. In the case where there is no response, the search is continued.

In step S506, the new and old devices are paired. In the example of FIGS. 3A to 3D, the relay device 300B is paired with the relay device 300C.

Figure 6:
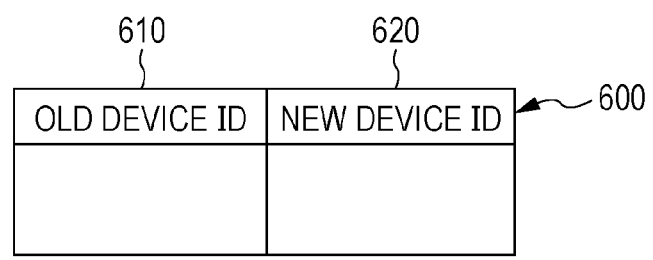
FIG. 6 is an explanatory diagram illustrating an exemplary data structure of a pairing information table.

In step S508, pairing information is stored. The pairing information may be data like a pairing information table 600, for example. FIG. 6 is an explanatory diagram illustrating an exemplary data structure of the pairing information table 600. The pairing information table 600 includes an old device ID field 610 and a new device ID field 620. In the exemplary embodiment, the old device ID field 610 stores information (specifically a device identification (ID)) for uniquely identifying the old relay device 300. The new device ID field 620 stores the device ID of the new relay device 300.

Through steps S506 and S608, a connection is established with the relay device 300 that responded. Thereafter, pairing is not performed with a different relay device 300.

In step S510, a network is set up in the old and new devices. In other words, a network is set up such that the old relay device 300 is capable of connecting to the WAN 290 by going through the new relay device 300. With this arrangement, the information processing devices 260 subordinate to the old device are capable of accessing the WAN 290 even while data is being copied. In the example of FIGS. 3A to 3D, communication settings are set in the relay devices 300B and 300C such that access information from the information processing devices 260 is passed from the relay device 300 to the relay device 300C, and conversely such that access information from an information processing devices connected to the WAN 290 is passed from the relay device 300C to the relay device 300B.

In step S512, a cluster reinstatement setting is set in the old device. This setting enables the old relay device 300 to be reinstated into the cluster. With this arrangement, availability is maintained. A cluster reinstatement condition is assumed to be understood in advance. For example, in the case in which maintaining the cluster configuration involves special routing and device settings, such special settings are processed in this step. In the example of FIGS. 3A to 3D, the relay device 300B is reinstated into the cluster with the relay device 300A. With this arrangement, the information processing devices 260 become capable of communicating with an information processing device on the WAN side via the relay device 300B as before. The routing of such access will be described later using the example in FIG. 16.

In step S514, data is copied from the old device to the new device. Settings in the old relay device 300 are copied to the new relay device 300. With this arrangement, the new relay device 300 becomes capable of operating according to the same settings as the old relay device 300. In the example of FIGS. 3A to 3D, data is copied from the relay device 300B to the relay device 300C.

In step S516, initialized information is stored, and the old device is stopped. In other words, when all of the data copying is completed, initialized information is stored in the information recording module 135 of the new relay device 300, and the new relay device 300 transmits a stop command to the old relay device 300. The new relay device 300 inherits the IP address of the old relay device 300. With this arrangement, the information processing devices 260 subordinate to the old relay device 300 become able to use the new relay device 300 without making any particular changes to settings. In the example of FIGS. 3A to 3D, the relay device 300C is set up to function in place of the relay device 300B, and the relay device 300B is stopped.

Figure 7:
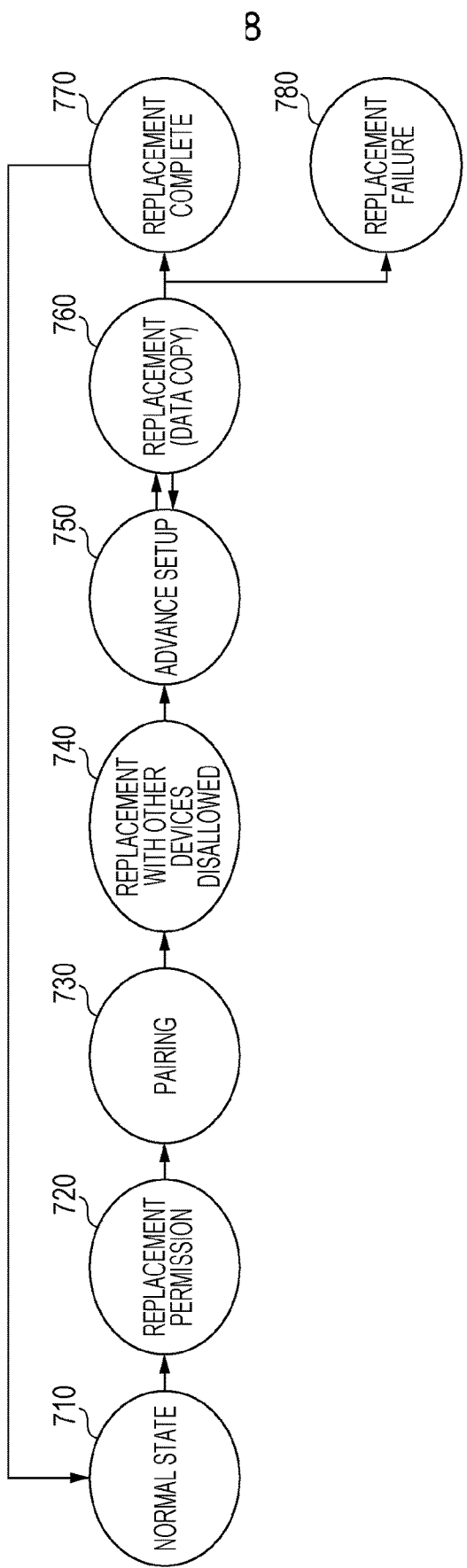
FIG. 7 is an explanatory diagram illustrating an example of state transitions in a replacement process according to the exemplary embodiment.

FIG. 7 is an explanatory diagram illustrating an example of state transitions in the replacement process according to the exemplary embodiment. FIG. 7 illustrates state transitions in the old and new relay devices 300.

The state transitions proceed in the order of a normal state 710, replacement permission 720, pairing 730, replacement with other devices disallowed 740, advance setup 750, and replacement (data copy) 760. After replacement (data copy) 760, the state transitions to either replacement complete 770 or replacement failure 780. Additionally, the state returns from replacement complete 770 to the normal state 710. Note that in the case of replacement failure 780, depending on the cause of the failure, the state returns to any of the states from the normal state 710 to replacement (data copy) 760.

The normal state 710 is the initial state of the old device, and indicates that replacement is prohibited. In this state, the WAN-side cable of the relay device 300 is connected.

In some cases, the state returns from replacement (data copy) 760 to advance setup 750. For example, in the case communication between the old device and the new device becomes unavailable due to a break in the line or the like, the state returns to advance setup 750. Note that the state of advance setup 750 refers to the state in which the network and the cluster are set up.

Figure 8:
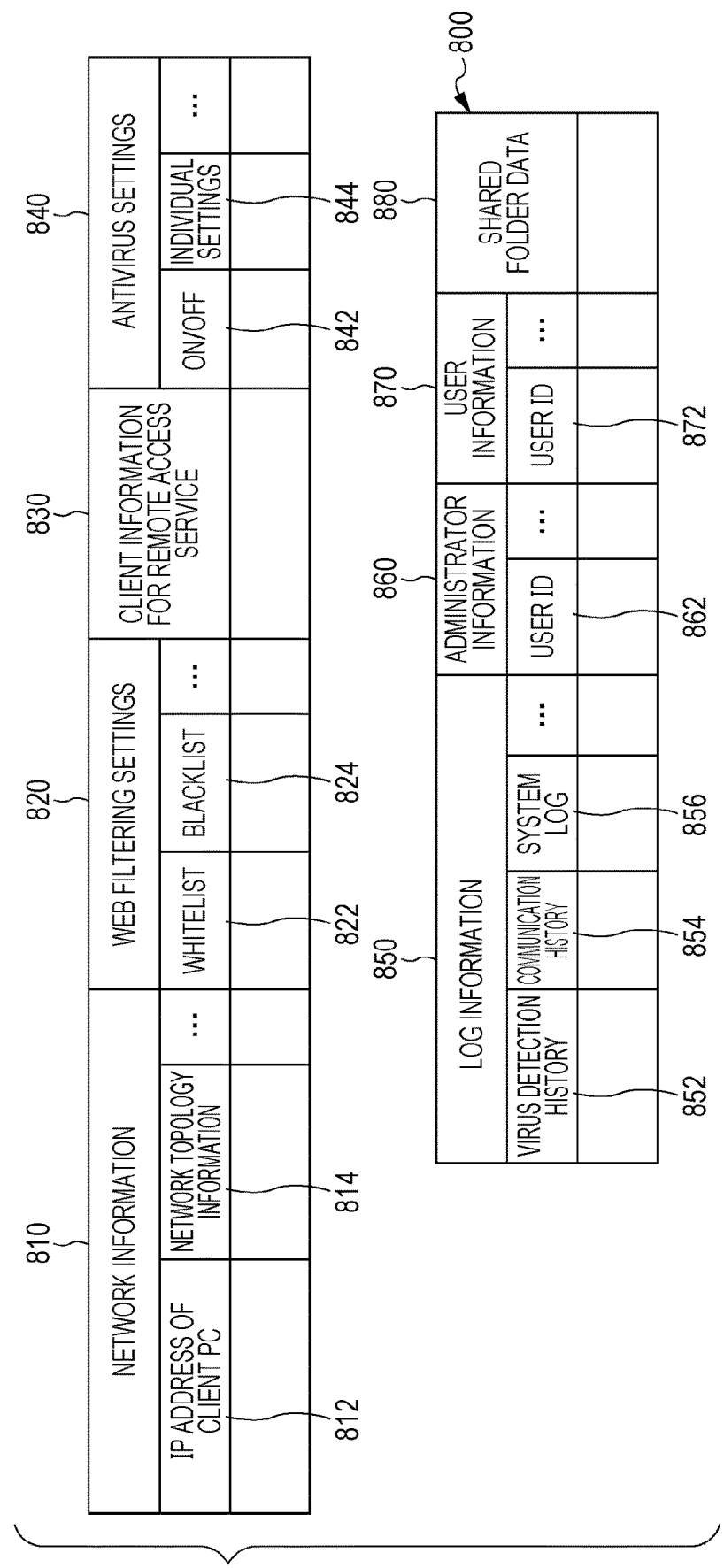
FIG. 8 is an explanatory diagram illustrating an exemplary data structure of a copy target information table.

The information to copy from the old relay device 300 to the new relay device 300 may be a copy target information table 800, for example. FIG. 8 is an explanatory diagram illustrating an exemplary data structure of the copy target information table 800. The copy target information table 800 includes a network information field 810, a Web filtering settings field 820, a client information for remote access service field 830, an antivirus settings field 840, a log information field 850, an administrator information field 860, a user information field 870, and a shared folder data field 880. The network information field 810 includes an IP address of client PC field 812, a network topology information field 814, and the like. The web filtering settings field 820 includes a whitelist field 822, a blacklist field 824, and the like. The antivirus settings field 840 includes an ON/OFF field 842, an individual settings field 844, and the like. The log information field 850 includes a virus detection history field 852, a communication history field 854, a system log field 856, and the like. The administrator information field 860 includes a user ID field 862 and the like. The user information field 870 includes a user ID field 872 and the like.

The network information field 810 stores network information. The IP address of client PC field 812 stores the IP addresses of client PCs such as the information processing devices 260 handled by the old relay device 300. The network topology information field 814 stores network topology information. The Web filtering settings field 820 stores settings information for Web filtering. The whitelist field 822 stores a whitelist, which is a list of targets that do not require caution. The blacklist field 824 stores a blacklist, which is a list of targets that may require caution. The client information for remote access service field 830 stores client information for a remote access service. The antivirus settings field 840 stores antivirus settings information. The ON/OFF field 842 stores the ON/OFF states of the antivirus settings. The individual settings field 844 stores individual antivirus settings information. The log information field 850 stores log information. The virus detection history field 852 stores history information about detected viruses. The communication history field 854 stores communication history information. The system log field 856 stores system log information. The administrator information field 860 stores administrator-related information. In the exemplary embodiment, the user ID field 862 stores information (specifically, a user identification (ID)) for uniquely identifying an administrator. The user information field 870 stores information about users other than the administrator. The user ID field 872 stores one or more user IDs. The shared folder data field 880 stores data inside shared folders stored by the old relay device 300.

In step S514, a slight downtime occurs from the stopping of the old relay device 300 until the switchover to the new relay device 300.

Accordingly, in the exemplary embodiment, a step or a user interface enabling the timing of the stop command to be designated may also be added.

Figure 11:
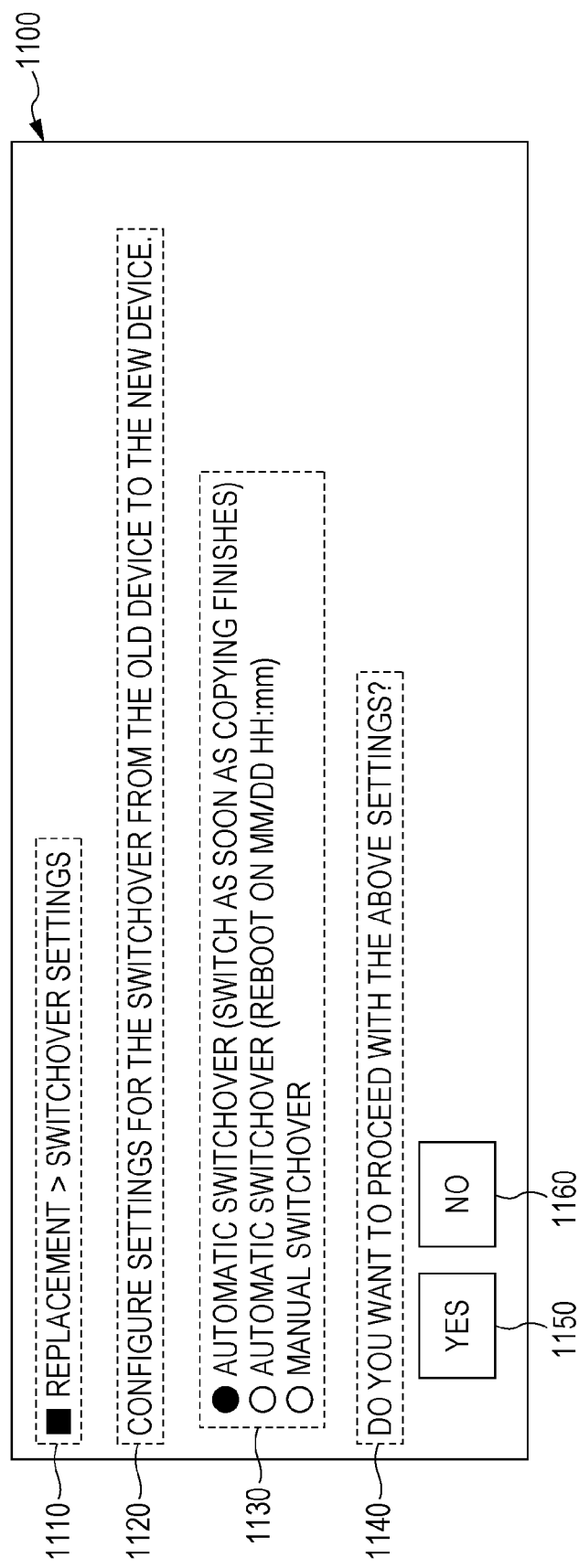
FIG. 11 is an explanatory diagram illustrating an exemplary display according to the exemplary embodiment.

For example, a screen 1100 illustrated in the example of FIG. 11 may be displayed as a user interface in the relay device 300. FIG. 11 is an explanatory diagram illustrating an exemplary display according to the exemplary embodiment. On the screen 1100, a title 1110, a message region 1120, a switchover timing selection region 1130, a message region 1140, a YES button 1150, and a NO button 1160 are displayed.

In the title 1110, "Replacement>Switchover Settings" is displayed, for example.

In the message region 1120, "Configure settings for the switchover from the old device to the new device." is displayed, for example.

In the switchover timing selection region 1130, (1) "Automatic switchover (switch as soon as copying finishes", (2) "Automatic switchover (reboot on MM/DD HH:mm)", and (3) "Manual switchover" are displayed, for example.

In the message region 1140, "Do you want to proceed with the above settings?" is displayed, for example. In the case in which the YES button 1150 is selected by the user, switchover settings are set according to the switchover method selected in the switchover timing selection region 1130. In the case in which the NO button 1160 is selected, the switchover method in the state before the screen 1100 was displayed is kept unchanged.

Figure 12:
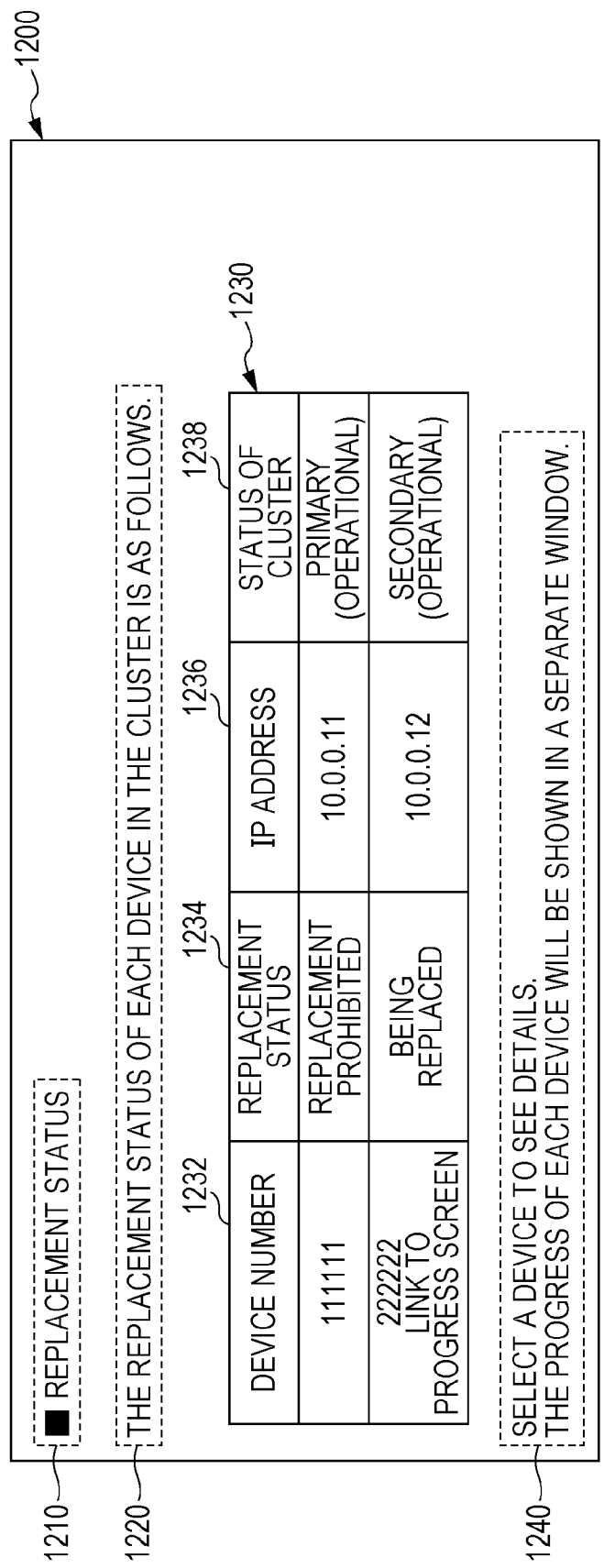
FIG. 12 is an explanatory diagram illustrating an exemplary display according to the exemplary embodiment.
Figure 13:
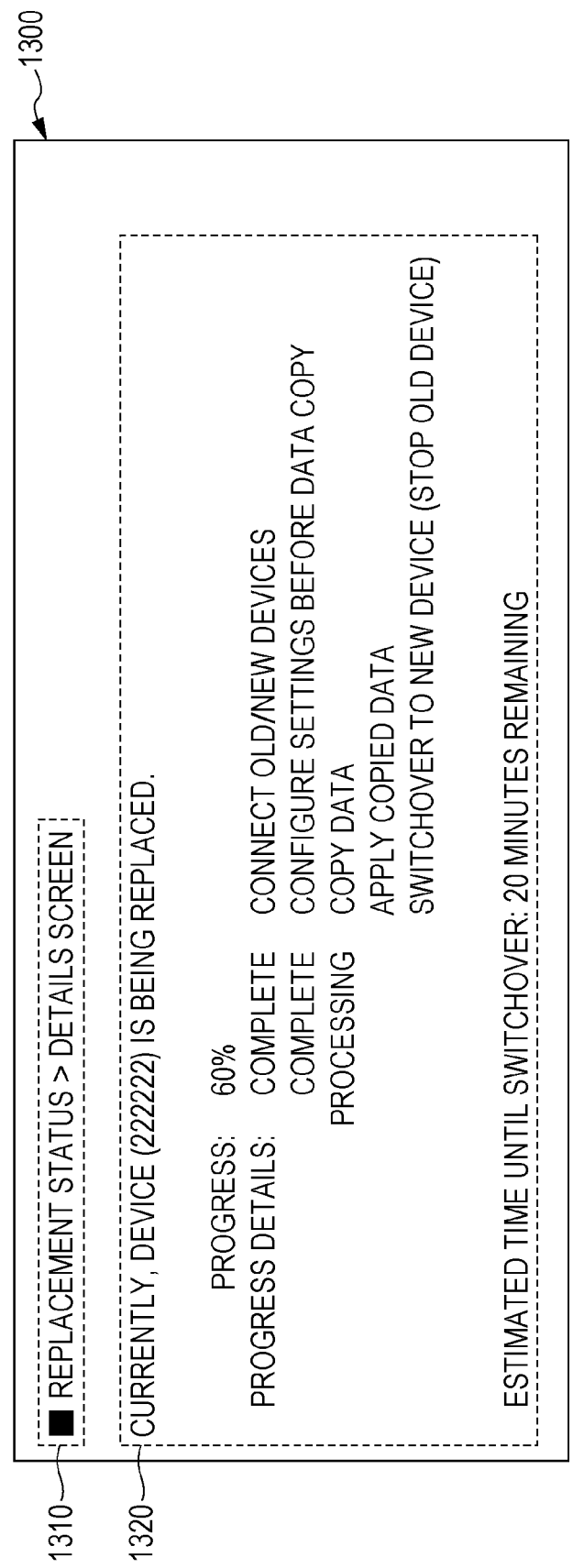
FIG. 13 is an explanatory diagram illustrating an exemplary display according to the exemplary embodiment.
Figure 14:
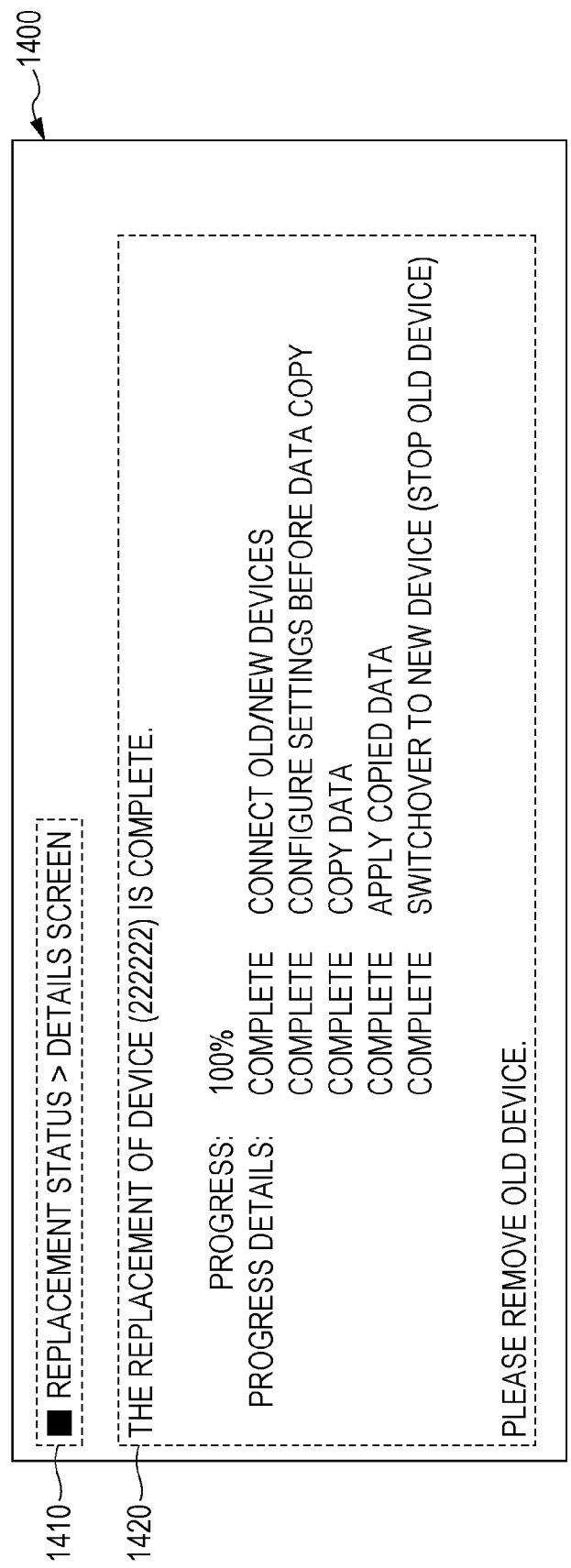
FIG. 14 is an explanatory diagram illustrating an exemplary display according to the exemplary embodiment.

The examples in FIGS. 12, 13, and 14 will be used to describe an example of displaying information indicating the replacement progress during the replacement process on a user interface.

The relay devices 300 automatically execute the replacement work (the process according to the flowcharts illustrated in the examples of FIGS. 4 and 5.

To be capable of informing the user of the status of replacement, the replacement state display module 150 displays the "information indicating the replacement progress" in the information recording module 135 on a display device.

FIG. 12 is an explanatory diagram illustrating an exemplary display according to the exemplary embodiment.

On a screen 1200, a title 1210, a message region 1220, a replacement status and other information display table 1230, and a message region 1240 are displayed.

In the title 1210, "Replacement Status" is displayed, for example.

In the message region 1220, "The replacement status of each device in the cluster is as follows." is displayed, for example.

In the message region 1240, "Select a device to see details. The progress of each device will be shown in a separate window." is displayed, for example.

The replacement status and other information display table 1230 displays a device number field 1232, a replacement status field 1234, an IP address field 1236, and a status of cluster field 1238. The device number field 1232 displays the device number of a targeted relay device 300. The replacement status 1234 displays the replacement status of the relay device 300. The IP address field 1236 displays the IP address of the relay device 300. The status of cluster field 1238 displays the status of the cluster for the relay device 300. For example, for the device number 111111 on the first row of the replacement status and other information display table 1230, the replacement status is "Replacement prohibited", the IP address is "10.0.0.11", and the status of the cluster is "Primary (operational)". For the device number 222222 on the second row of the replacement status and other information display table 1230, the replacement status is "Being replaced", the IP address is "10.0.0.12", and the status of the cluster is "Secondary (operational)".

FIG. 13 is an explanatory diagram illustrating an exemplary display according to the exemplary embodiment. The display illustrated in the example of FIG. 13 is displayed in the case in which "Link to progress screen" of the device number 222222 illustrated in the example of FIG. 12 is selected.

On a screen 1300, a title 1310 and a progress status display region 1320 are displayed.

In the title 1310, "Replacement Status>Details Screen" is displayed, for example.

In the progress status display region 1320, information like the following is displayed, for example.

---

Currently, device (222222) is being replaced.
    Progress: 60%
        Progress details:    Complete Connect old/new devices
                              Complete Configure settings before
data copy
                          Processing      Copy data
                                        Apply copied data
                                        Switchover to new
device (stop old device)
        Estimated time until switchover: 20 minutes remaining

---

FIG. 14 is an explanatory diagram illustrating an exemplary display according to the exemplary embodiment. An exemplary display in the case of going from the state (progress: 60%) illustrated in the example of FIG. 13 to a state in which the replacement process is finished (progress: 100%) is illustrated.

On a screen 1400, a title 1410 and a progress status display region 1420 are displayed.

In the title 1410, "Replacement Status>Details Screen" is displayed, for example.

In the progress status display region 1420, information like the following is displayed, for example.

---

The replacement of device (222222) is complete.
    Progress: 100%
        Progress details:      Complete Connect old/new devices
                                Complete Configure settings before
data copy
                                    Complete Copy data
                                    Complete Apply copied data
                                    Complete Switchover to new device
(stop old device)
Please remove old device.

---

In the case in which multiple relay devices 300 are multiplexed and there are multiple devices to be replaced, replacing the relay devices 300 one at a time in a consecutive process involves a work time proportional to the number of devices.

Accordingly, to shorten the time of the replacement process, the case of replacing multiple relay devices 300 at the same time will be described.

If the WAN-side cable is disconnected from multiple old relay devices 300, these relay devices 300 temporarily enter the pairable state, but since an old relay device 300 that has completed pairing with a new relay device 300 no longer responds to a search packet from a new relay device 300, it is possible to replace all of the old relay devices 300 without having one of the old relay devices 300 pairing with multiple new relay devices 300.

Figure 15B:
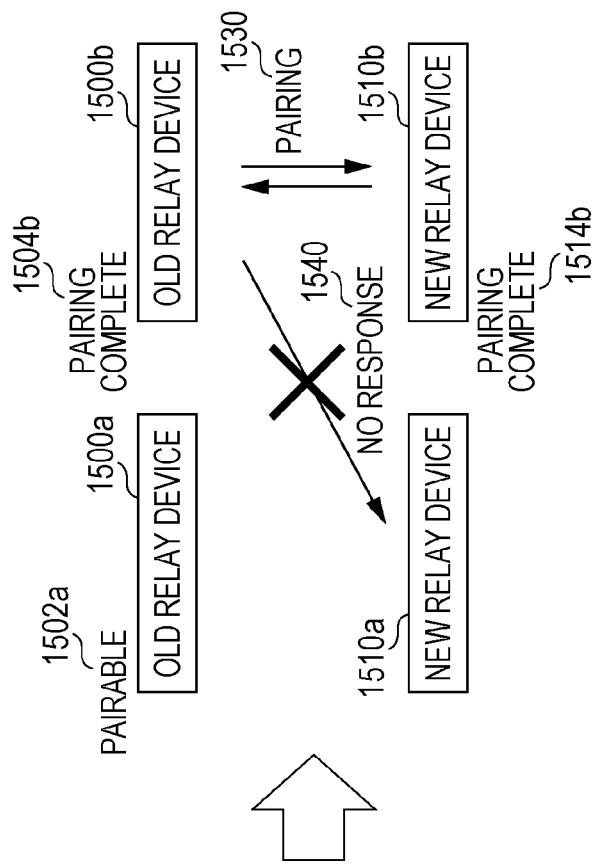
FIGS. 15A and 15B are explanatory diagrams illustrating an exemplary process according to the exemplary embodiment.
Figure 15A:
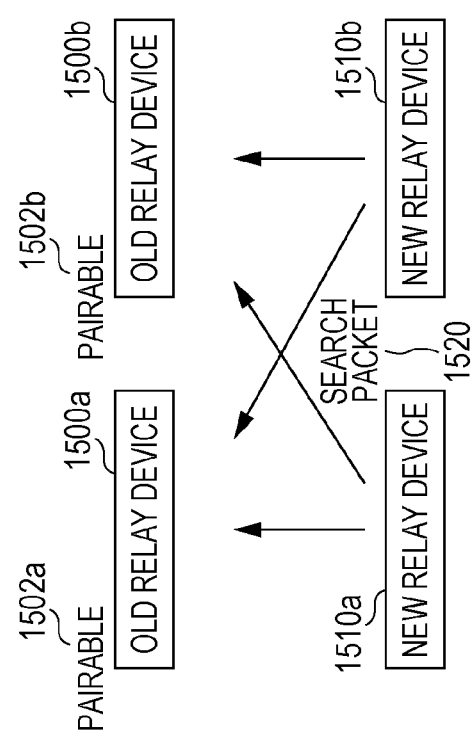

The example of FIGS. 15A and 15B will be used to describe the process in the case of multiple devices to be replaced. FIGS. 15A and 15B are explanatory diagrams illustrating an exemplary process according to the exemplary embodiment.

The example in FIG. 15A illustrates a state in which two new relay devices 1510 (a new relay device 1510a and a new relay device 1510b) are connected to replace two old relay devices 1500 (an old relay device 1500a and an old relay device 1500b).

The WAN-side cable is disconnected from the old relay device 1500a, and therefore the old relay device 1500a is in a pairable state 1502a. The WAN-side cable is also disconnected from the old relay device 1500b, and therefore the old relay device 1500b is in a pairable state 1502b.

The new relay device 1510a uses a broadcast to transmit a search packet 1520 to the old relay device 1500a and the old relay device 1500b.

The new relay device 1510a also uses a broadcast to transmit the search packet 1520 to the old relay device 1500a and the old relay device 1500b.

The example in FIG. 15B illustrates a state in which the pairing of one pair is complete. In other words, since the old relay device 1500b responded to the search packet of the new relay device 1510b, the old relay device 1500b and the new relay device 1510b transition to a state of pairing 1530. Consequently, the old relay device 1500b is in a pairing complete state 1504b and the new relay device 1510b is in a pairing complete state 1514b. After that, the new relay device 1510a continues to use a broadcast to transmit the search packet 1520 to the old relay device 1500b, but the old relay device 1500b gives no response 1540.

After that, if the old relay device 1500a responds to the search packet 1520 from the new relay device 1510a, the pairing between the old relay device 1500a and the new relay device 1510a is completed, and the two pairs (specifically, the pair of the old relay device 1500b and the new relay device 1510b, and the pair of the old relay device 1500a and the new relay device 1510a) perform the replacement processes illustrated in the examples of FIGS. 4 and 5 in parallel.

The process by which the relay device 300B goes through the relay device 300C to function as a relay device for the information processing device 260B subordinate to the relay device 300B will be described using the example of FIG. 16. FIG. 16 is an explanatory diagram illustrating an exemplary process according to the exemplary embodiment.

FIG. 16 illustrates a case in which the relay device 300 has been reinstated into the cluster in step S512 illustrated in the example of FIG. 5, and while the process of copying data from the relay device 300B to the relay device 300C is being performed, the information processing device 260B and an information processing device 1610.

For example, in the case in which the information processing device 260B transmits data to the information processing device 1610, the data follows a route 1600. In other words, data is transmitted from the information processing device 260B to the relay device 300B through the hub 220 as in the past. Next, since the relay device 300B is in the middle of the copy process (in other words, the relay device 300B and the router 210 are not connected directly), the relay device 300B forwards the data to the relay device 300C through the hub 220, and the relay device 300C transmits the data to the information processing device 1610 via the router 210 and the WAN 290. In the case of transmitting data from the information processing device 1610 to the information processing device 260B, the data follows the reverse of the route 1600 described above. In other words, data is transmitted from the information processing device 1610 to the relay device 300C via the WAN 290 and the router 210. Next, the relay device 300C forwards the data to the relay device 300B through the hub 220, and the relay device 300B transmits the data to the information processing device 260B through the hub 220 as in the past.

With this arrangement, the relay device 300B is reinstated into the cluster and functions as a relay device, even while in the middle of the copy process.

Figure 17:
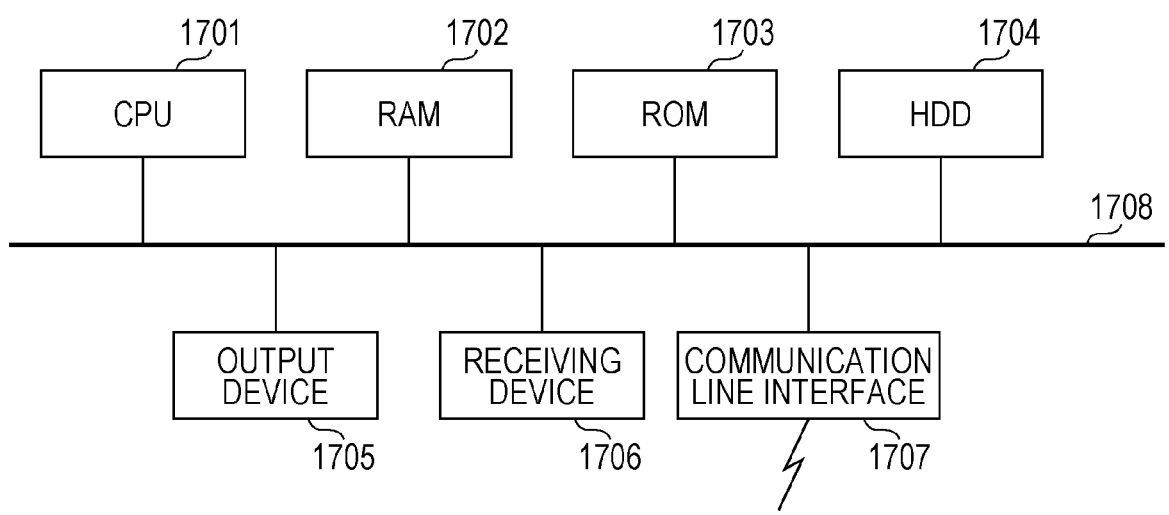
FIG. 17 is a block diagram illustrating an exemplary hardware configuration of a computer that realizes the exemplary embodiment.

Note that a hardware configuration of a computer executing a program that acts as the exemplary embodiment is a general computer as illustrated by the example of FIG. 17, and specifically is a computer or the like that may act as a server. In other words, as a specific example, a CPU 1701 is used as a processing unit (computational unit), while RAM 1702, ROM 1703, and an HDD 1704 are used as storage devices. For the HDD 1704, a hard disk drive (HDD), a solid-state drive (SSD) that is flash memory, or the like may be used, for example. The computer includes the CPU 1701 that executes programs such as the data transmitting/receiving module 105, the device replacement module 110, the replacement device search module 115, the network setting module 120, the data copy module 125, the link monitor module 130, the cluster determination module 140, the cluster reinstatement module 145, the replacement state display module 150, and the replacement permission state setting module 155, the RAM 1702 that stores such programs and data, the ROM 1703 that stores programs and the like for booting the computer, the HDD 1704 which is an auxiliary storage device that includes the functions of the information recording module 135 and the like, a receiving device 1706 that receives data on the basis of operations performed by a user (including actions, voice commands, gaze, and the like) with respect to devices such as a keyboard, a mouse, a touchscreen, a microphone, and a camera (including a gaze detection camera or the like), an output device 1705 such as a CRT, a liquid crystal display, or a speaker, a communication line interface 1707 such as a network interface card for connecting to a communication network, and a bus 1708 for joining and exchanging data with the above components. Multiple such computers may also be connected to each other by a network.

In the case of the foregoing exemplary embodiment being realized by a computer program, the computer program in the form of software is made to be read into a system with the above hardware configuration, and the foregoing exemplary embodiment is realized by the cooperative action of the software and hardware resources.

Note that the hardware configuration illustrated in FIG. 17 illustrates a single exemplary configuration, and that the exemplary embodiment is not limited to the configuration illustrated in FIG. 17 insofar as the configuration still enables execution of the modules described in the exemplary embodiment. For example, some modules may also be realized with special-purpose hardware (such as an application-specific integrated circuit (ASIC) or a field-programmable gate array (FPGA), for example), and some modules may be configured to reside within an external system and be connected via a communication link. Furthermore, it may also be configured such that multiple instances of the system illustrated in FIG. 17 are connected to each other by a communication link and operate in conjunction with each other. Additionally, the communication device 100 (or relay device 300) may also be incorporated into a device such as an information appliance, a robot, a photocopier, a fax machine, a scanner, a printer, or a multi-function device (that is, an image processing device having two or more from among scanning, printing, copying, and faxing functions).

Note that the described program may be provided stored in a recording medium, but the program may also be provided via a communication medium. In this case, for example, the program described above may also be considered to be a "non-transitory computer readable medium storing a program".

A "non-transitory computer readable medium storing a program" refers to a non-transitory computer readable recording medium upon which the program is recorded, and which is used to install, execute, and distribute the program, for example.

Note that the recording medium may be a Digital Versatile Disc (DVD), encompassing formats such as DVD-R, DVD-RW, and DVD-RAM defined by the DVD Forum and formats such as DVD+R and DVD+RW defined by DVD+RW Alliance, a compact disc (CD), encompassing formats such as read-only memory (CD-ROM), CD Recordable (CD-R), and CD Rewritable (CD-RW), a Blu-ray Disc (registered trademark), a magneto-optical (MO) disc, a flexible disk (FD), magnetic tape, a hard disk, read-only memory (ROM), electrically erasable and programmable read-only memory (EEPROM (registered trademark)), flash memory, random access memory (RAM), or a Secure Digital (SD) memory card, for example.

In addition, all or part of the above program may also be recorded to the recording medium and saved or distributed, for example. Also, all or part of the above program may be communicated by being transmitted using a transmission medium such as a wired or wireless communication network used in a local area network (LAN), a metropolitan area network (MAN), a wide area network (WAN), the Internet, an intranet, an extranet, or some combination thereof, or alternatively, by being modulated onto a carrier wave and propagated.

Furthermore, the above program may be part or all of another program, or may be recorded to a recording medium together with other separate programs. The above program may also be recorded in a split manner across multiple recording media. The above program may also be recorded in a compressed, encrypted, or any other recoverable form.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A relay device comprising:
a link monitor module that detects an inability to connect to a wide-area information communication network in a case in which the relay device is multiplexed with another relay device;
a replacement permission state setting module that, in a case in which the link monitor module detects an inability to connect to the wide-area information communication network, when a request searching for a replacement partner is received from another relay device, replies to the another relay device with information indicating that the relay device itself is a replacement partner; and
a transmission unit that transmits information set in the relay device itself to the another relay device.

2. The relay device according to claim 1, wherein
after already having replied to the another relay device with the information, the replacement permission state setting module does not reply in a case in which a request searching for a replacement partner is received from yet another relay device.

3. A non-transitory computer readable medium storing a program causing a computer to execute a process for functioning as a relay device, the process comprising:
 detecting an inability to connect to a wide-area information communication network in a case in which the computer functioning as a relay device is multiplexed with another relay device;
 in a case of detecting the inability to connect to the wide-area information communication network, when a request searching for a replacement partner is received from another relay device, replying to the another relay device with information indicating that the computer functioning as a relay device itself is a replacement partner; and
 transmitting information set in the computer functioning as a relay device itself to the another relay device.

4. A non-transitory computer readable medium storing a program causing a computer to execute a process for functioning as a relay device, the process comprising:
 transmitting a request searching for a replacement partner to another relay device connected to a local information communication network side;
 in a case in which a reply to the transmitted request is received, receiving information from the another relay device that replied; and
 setting the received information in the computer functioning as a relay device itself.

\* \* \* \* \*